(12) United States Patent
Ohsawa et al.

(10) Patent No.: US 6,557,979 B2
(45) Date of Patent: May 6, 2003

(54) INK JET PRINTING PROCESS AND PRINTING APPARATUS

(75) Inventors: Sadao Ohsawa, Shizuoka (JP); Yusuke Nakazawa, Shizuoka (JP); Eiichi Kato, Shizuoka (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 09/852,213

(22) Filed: May 10, 2001

(65) Prior Publication Data
US 2001/0055047 A1 Dec. 27, 2001

(30) Foreign Application Priority Data
May 11, 2000 (JP) ........................ 2000-138638

(51) Int. Cl.[7] ................................................ B41J 2/06
(52) U.S. Cl. ........................................................ 347/55
(58) Field of Search ............................ 347/55, 151, 120, 347/141, 154, 103, 123, 111, 159, 127, 128, 131, 125, 158; 399/271, 290, 292, 293, 294, 295

(56) References Cited

U.S. PATENT DOCUMENTS 6,386,696 B1 * 5/2002 Rodi et al. ................. 347/103
6,402,315 B1 * 6/2002 Kato ........................... 347/100

FOREIGN PATENT DOCUMENTS

JP        10-286939        10/1998

* cited by examiner

Primary Examiner—Raquel Yvette Gordon
(74) Attorney, Agent, or Firm—Sughrue Mion, PLLC

(57) ABSTRACT

A printing process for preparing a printed matter comprising: forming an image on the surface of an image carrier by an ink jet method comprising ejecting an oil-based ink using electrostatic field based on signals of image data; and contact-transferring the image formed on the image carrier onto a printing medium to prepare a printed matter. Also disclosed is a printing apparatus suitable for the process.

24 Claims, 12 Drawing Sheets

INK JET PRINTING PROCESS AND PRINTING APPARATUS

FIELD OF THE INVENTION

The present invention relates to a printing process for forming a printed image on a printing medium by an electrostatic ink jet method using an oil-based ink, more specifically, the present invention relates to an ink jet printing process and a printing apparatus, where an image is formed by an ink jet method and a printed matter is prepared by contact-transferring the image onto a printing medium and where very high-quality printed image and high-speed printing can be attained.

BACKGROUND OF THE INVENTION

The printing process for forming a printed image on a printing medium based on image data signals includes an electrophotographic method, a sublimation-type or melting-type heat-transfer method and an ink jet method.

The electrophotographic method requires a process of forming an electrostatic latent image on a photoreceptor drum through electrification and exposure and therefore, suffers from complicated system and expensive apparatus.

The heat-transfer method uses an ink ribbon and therefore, despite its inexpensive apparatus, suffers from high running cost and treatment of a waste material.

The ink jet method performs the printing directly on a printing medium by ejecting an ink only on a desired image area using an inexpensive apparatus and therefore, ensures efficient use of a coloring agent and low running cost.

With respect to the method for applying the ink jet technology to printing system, for example, JP-A-10-286939 (the term "JP-A" as used herein means an "unexamined published Japanese patent application") discloses a process for additionally printing variable numbers, marks or the like on the same printing paper using the ink jet system by providing an ink jet printing apparatus to a rotary printing press.

The printing of image information is preferably in a level as high as comparable to the photographic image, however, conventional ink technologies of pressure-ejecting an aqueous or organic solvent-type ink containing a dye or pigment as a coloring agent is disadvantageous in that since a droplet containing a large amount of a solvent is ejected, unless expensive exclusive paper is used, the printed image blurs.

Accordingly, in the case of performing the printing on a normal printing paper, a plastic sheet as a non-absorptive medium, or the like, a high-quality printed image cannot be obtained.

As one of the ink jet technologies, a method of heat-melting an ink which is solid at an ordinary temperature, and jetting out the obtained liquid ink to form an image is known. When this ink is used, blurring of the printed image may be reduced, however, because of high viscosity of the ink at the ejection, a fine droplet cannot be jetted out and the obtained individual dot images are large in both the area and the thickness, as a result, a high-precision image cannot be formed.

SUMMARY OF THE INVENTION

The present invention has been made to solve the above-describe problems.

That is, an object of the present invention is to provide an ink jet printing process where an inexpensive apparatus and a simple method can be used, the ink can be ejected at exact positions with extremely high precision, a high-precision image can be in turn formed, and a printed matter having a clear and high-quality image can be printed.

Another object of the present invention is to provide a printing apparatus for realizing the process.

Other objects and effects of the present invention will become apparent from the following description.

The above-described objects of the present invention have been achieved by providing the following processes and apparatuses.

(1) A printing process for preparing a printed matter comprising:

forming an image on the surface of an image carrier by an ink jet method comprising ejecting an oil-based ink using electrostatic field based on signals of image data; and contact-transferring the image formed on said image carrier onto a printing medium to prepare a printed matter.

(2) The ink jet printing process according to item (1) above, wherein said oil-based ink comprises:

a nonaqueous solvent having an electric resistivity of $10^9$ $\Omega$cm or more and a dielectric constant of 3.5 or less; and a component dispersed in said nonaqueous solvent, which comprises at least colored particles.

(3) The ink jet printing process according to item (1) or (2) above, further comprises adjusting a surface temperature of said image carrier to the range of from 30 to 40° C. at the time of forming an image on said image carrier.

(4) The ink jet printing process according to any one of items (1) to (3) above, further comprising fixing the image contact-transferred onto the printing medium.

(5) A printing apparatus comprising:

ink jet drawing unit which ejects an oil-based ink from an ejection head using an electrostatic field based on signals of image data to form an image on an image carrier; and image transfer member which contact-transfers the image formed on said image carrier onto a printing medium to obtain a printed matter.

(6) The printing apparatus according to item (5) above, wherein said oil-based ink comprises:

a nonaqueous solvent having an electric resistivity of $10^9$ $\Omega$cm or more and a dielectric constant of 3.5 or less; and a component dispersed in said nonaqueous solvent, which comprises at least colored particles.

(7) The printing apparatus according to items (5) or (6) above, wherein said image carrier is a rotary body comprising a drum or an endless belt.

(8) The printing apparatus according to any one of items (5) to (7) above, wherein said image carrier has elasticity.

(9) The printing apparatus according to any one of items (5) to (8) above, further comprising a temperature-controlling member which adjusts a surface temperature of said image carrier to the range from 30 to 40° C. at the time of ejecting the ink on said image carrier from said ink jet drawing unit.

(10) The printing apparatus according to any one of items (5) to (9) above, further comprising a cleaning member which cleans said image carrier.

(11) The printing apparatus according to any one of items (5) to (10) above, further comprising an image fixing member which fixes the image contact-transferred onto said printing medium.

(12) The printing apparatus according to item (11) above, wherein said image fixing member has a heating member comprising at least one of a heat roller, an infrared lamp, a halogen lamp and a xenon lamp.

(13) The printing apparatus according to item (12) above, wherein said heating member is disposed and/or controlled to gradually elevate a temperature of said printing medium at the time of fixing said image.

(14) The printing apparatus according to any one of items (7) to (13) above, wherein said rotary body is rotatable to perform main scanning at the time of drawing an image on said image carrier.

(15) The printing apparatus according to item (14) above, wherein said ejection head comprises a single channel head or a multi-channel head and is movable in a direction parallel to the axis of said rotary body to perform sub-scanning.

(16) The printing apparatus according to item (14) above, wherein said ejection head comprises a full line head having almost the same length as a width of said rotary body in the axis direction.

(17) The printing apparatus according to any one of items (5) to (16) above, wherein said ink jet drawing unit further has an ink supply member which supplies said oil-based ink to said ejection head.

(18) The printing apparatus according to item (17) above, further comprising an ink recovery member which recovers said oil-based ink from said ejection head.

(19) The printing apparatus according to any one of items (5) to (18) above, wherein said ink jet drawing unit further has an ink tank for storing said oil-based ink and a stirring member which stirs said oil-based ink in said ink tank.

(20) The printing apparatus according to any one of items (5) to (19) above, wherein said ink jet drawing unit has an ink temperature-controlling member which controls the temperature of said oil-based ink in at least one of an ink tank for storing said oil-based ink and an ink passage.

(21) The printing apparatus according to any one of items (5) to (20) above, wherein said ink jet drawing unit has an ink concentration-controlling member which controls the concentration of said oil-based ink.

(22) The printing apparatus according to any one of items (5) to (21) above, further comprising at least a pair of capstan rollers which allows said printing medium to travel while being interposed and held therebetween to perform the transfer.

(23) The printing apparatus according to any one of items (5) to (22) above, further comprising a cleaning member which removes dusts present on the surface of said printing medium at least one of before and during the transfer onto said printing medium.

(24) The printing apparatus according to any one of items (5) to (23) above, further comprising a cleaning member which cleans said ejection head.

As understood from these constructions, the present invention has a feature that an image is formed on the surface of an image carrier by an ink jet method of ejecting an oil-based ink using an electrostatic field and the image is contact-transferred onto a printing medium to prepare a printed matter.

The image carrier has a lubricant surface, as described later, on a drum or the like capable of being worked and disposed with high mechanical precision and at the same time, the distance from the head can be precisely adjusted, so that the ink can be ejected at exact positions with extremely high precision and therefore, a high-precision image can be formed.

The image is formed on a printing medium through contract-transfer from the image carrier, so that the contact pressure, contact temperature and the like of the ink at the transfer onto the printing medium can be controlled to appropriate values and therefore, the retentivity of image transferred onto the printing medium can be elevated. When the transferred image is subjected to a fixing step, the retentivity of image can be more improved.

The ink jet process according to the present invention is described in PCT Publication WO93/11866. In this ink jet process, an ink having high resistance obtained by dispersing at least colored particles in an insulating solvent is used, a strong electric field is allowed to act on this ink at the ejection position to form an agglomerate of colored particles at the ejection position, and the agglomerate is ejected from the ejection position using electrostatic means. As such, the colored particles are ejected as an agglomerate formed to a high concentration and the ink droplet contains only a small amount of solvent, as a result, a high-density clear image free of blurring is formed on the surface of a drawing drum. xx In this ink jet process, the size of the ink droplet ejected is determined by the size of the distal end of the ejecting electrode or the conditions in forming the electric field. Therefore, when a small ejection electrode and appropriate electric field-forming conditions are used, a small ink droplet can be obtained without reducing the ejection nozzle size or slit width.

In other words, the present invention provides an ink jet printing process where a fine image can be controlled without causing any problem of ink clogging in the head and a printed matter having a clear and high-quality image can be printed.

DETAILED DESCRIPTION OF THE INVENTION

The present invention is described in detail below.

Figure 1A:
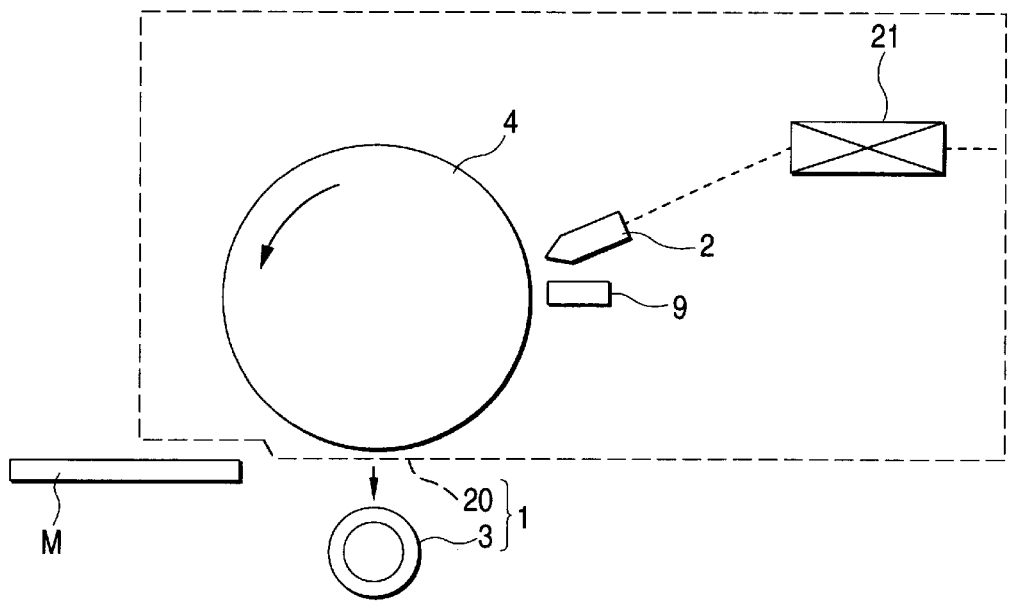
FIGS. 1(a) and 1(b) are construction views of a printing apparatus for use in practicing the ink jet printing process of the present invention.
Figure 1B:
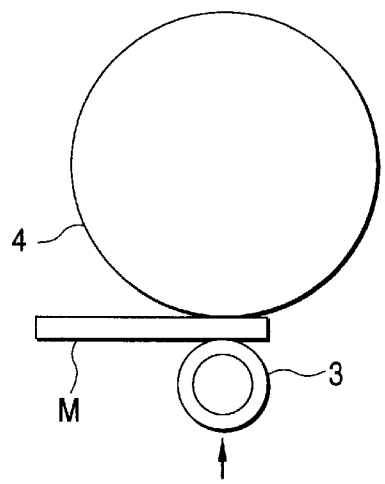
Figure 2:
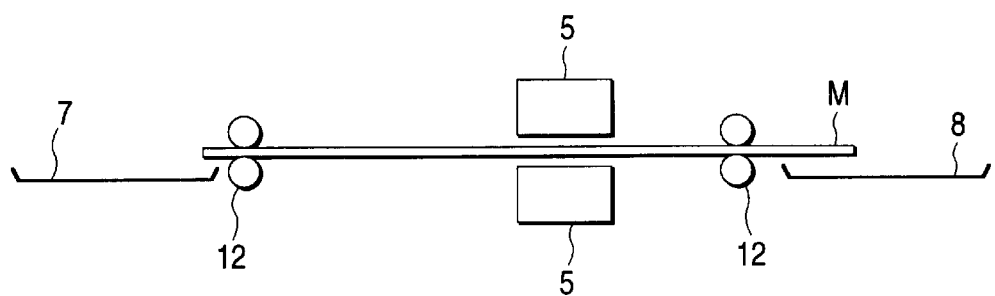
FIG. 2 is a construction view of a fixing apparatus for fixing the image transferred onto a printing medium M.

FIGS. 1 and 2 each shows a construction example of a printing apparatus for realizing the ink jet printing process of the present invention.

The printing process of the present invention is described by referring to the construction view of the printing apparatus shown in FIG. 1. In this figure, 1 is an ink jet printing apparatus of the present invention and the printing apparatus 1 is roughly divided into ink jet drawing unit (hereinafter referred to as "drawing unit") 20 of forming an image on an image carrier and image transfer member 3 of contact-transferring the image formed on the image carrier onto a printing medium to obtain a printed matter. The drawing unit 20 further has an image carrier described below. Examples of the image carrier include a rotary body such as drum (hereinafter referred to as "drawing drum") or endless belt. The present invention is described below by taking the drawing drum as an example, however, the present invention is not limited to this construction example.

The drawing drum 4 is usually formed of a metal such as aluminum, stainless steel or iron, a plastic, a glass or the like and in order to improve the adhesive property to the printing medium which is described later, an elastic layer comprising styrene butadiene rubber, isoprene rubber, silicon rubber, nitrile rubber, butyl rubber, fluororubber or the like is preferably provided thereon. The thickness of the elastic layer is preferably 0.2 mm or more, more preferably 0.7 mm or more, and the preferred range thereof is usually on the order of 1 to 15 mm. On the surface of the elastic layer, a surface layer is further formed using a thermoplastic resin individually or in combination, such as polyethylene, polypropylene, polyethylene terephthalate, vinyl chloride, polystyrene, polyurethane, polyamide and ethylene vinyl acetate polymer or copolymer. On the surface layer, an image to be contact-transferred onto a printing medium is formed and for controlling the releasability of the image at the transfer, fluororesin or silicon resin in the form of a polymer and/or a fine powder material is preferably added to the surface layer. The surface layer is formed on the surface of the elastic layer of the drawing drum 4 by dispersing or coating the thermoplastic resin together with a solvent and other additives. The thickness of the surface layer is suitably on the order of 10 µm to 1 mm.

The drawing drum 4 preferably has an earth function to act as a counter electrode of the ejection head electrode at the electrostatic ejection. In the case where the insulating property increases due to the thicknesses of the elastic layer and the surface layer formed on the drawing drum 4, an electrically conducting layer may further be provided on the drawing drum 4. In this case, the means for taking the earth is preferably provided in this electrically conducting layer and for this purpose, known means having electrical conductivity, such as brush, leaf spring or roller may be used.

The drawing unit 20 further has a drawing device 2 which ejects an oil-based ink on the surface layer of the drawing drum 4 in correspondence to the image data sent from an image data arithmetic and control part 21 which is described later, to form an image. At the formation of image, the surface layer is preferably adjusted to a temperature of 30 to 40° C. so as to fix the oil-based ink to the surface layer without fail.

The drawing unit 20 has dust-removing means 9 for removing dusts present on the surface layer of the drawing drum 4 before and/or during the drawing of an image on the surface layer of the drawing drum 4. By this means, the ink can be effectively prevented from adhering to the surface layer of the drawing drum 4 by the help of dusts invaded between the head and the drawing drum 4 during the image formation. For the dust-removing means 9, a known non-contact method such as suction removal, blowing removal or electrostatic removal, or a contact method by a brush, a roller or the like may be used. In the present invention, air suction, air blowing or a combination thereof is preferably used.

After the formation of an image on the surface layer of the drawing drum 4, the image is transferred to a printing medium M (for example, plain paper sheet). The transfer of image is performed using image transfer member 3. In FIG. 1, the image transfer member 3 is realized by a heat roller 3 disposed to face the drawing drum 4 and heated to a predetermined temperature (usually in a preferred range on the order of 40 to 120° C.). A printing medium M is interposed and held between the heat roller 3 as the image transfer member and the drawing drum 4, and the printing medium M is contacted with the drawing drum 4 to perform the transfer. At the formation of an image on the surface layer of the drawing drum 4, the heat roller 3 retreats not to contact with the drawing drum 4 (see, FIG. 1(a)) and at the transfer of the image, the heat roller 3 is approximated and contacted with the drawing drum 4 under a predetermined pressure (see, FIG. 1 (b)). At the formation of an image on the surface of the drawing drum 4, the surface of the drawing drum 4 is heated to a temperature of 30 to 40° C. and therefore, when the drawing drum 4 and the printing medium M are contacted, the image on the surface of the drawing drum 4 in the heated state is transferred to the printing medium M. By the conjoint help of the contact pressure between the drawing drum 4 and the printing medium M, the image transferred to the printing medium M is surely held there.

Furthermore, the image transferred to the printing medium M is fixed in the fixing step (see, FIG. 2) described later and thereby, the force of retaining the image on the printing medium M is more intensified.

FIG. 2 shows one example of the fixing apparatus for fixing the image transferred to the printing medium M.

In the Figure, 5 is a fixing apparatus. The fixing apparatus used here may be known means such as heat-fixing or solvent-fixing, however, in this example, heat-fixing using a heat roller, an infrared lamp, a halogen lamp or a xenon lam is employed. At the time of fixing the image by the heating member, the temperature of the printing medium is preferably elevated step by step and therefore, the heating member is preferably disposed or controlled to give such an effect.

The printing medium M is transported to the fixing apparatus 5 while interposing and holding it between two pairs of capstan rollers 12, and the oil-based ink image transferred onto the printing medium M is fixed here. In this case, an automatic feed device 7 of automatically feeding the printing medium M and an automatic discharge device of automatically discharging the fixed printing medium M are preferably provided. By using these automatic feed device 7 and automatic discharge device 8, the printing operation is more facilitated and the printing time can be shortened, as a result, the effect of the present invention is more elevated.

At the transportation of the printing medium M, the head/edge of the printing medium is prevented from fluttering to come into contact with the fixing apparatus 5 and cause damages by providing printing medium-guiding means not shown. Furthermore, means of preventing loosening of the printing medium M only in the periphery of the fixing site of the fixing apparatus 5 may be provided and by actuating this means at least at the time of performing the fixing, the printing medium M can be prevented from contacting with the fixing apparatus 5. To speak specifically, for example, a method of disposing a presser roller upstream and downstream the fixing apparatus may be used.

As such, the ink jet printing apparatus 1 of the present invention comprises drawing unit 20 and image-transfer member 3 and in the downstream side thereof, a fixing apparatus 5 is provided.

Various printing apparatuses having mounted thereon the above-described printing apparatus are specifically described below by referring to the entire structure of each apparatus. FIGS. 3 to 10 each is a view schematically showing respective entire constructions of various printing apparatuses using the printing apparatus and the fixing apparatus of FIGS. 1 and 2. These examples are common by having drawing unit 20 (drawing device 2+drawing drum+dust-removing means 9 (shown only in FIG. 3 but not in others)) but differ in the number and site of drawing unit 20 disposed, the shape of the printing medium and the transportation system for transporting the printing medium.

FIGS. 3 to 8 each is a printing apparatus where the image is transferred and fixed by moving the printing medium along the rotation of the transportation drum. Out of these, FIGS. 3 to 6 each is a view schematically showing a construction example of a web-type printing apparatus where a rolled printing medium is tensioned by putting it over a transportation roll, a printing medium feed roll and a printing medium take-up roll or a guide roll. In these construction examples of the web-type printing apparatus, one-side monochromatic printing is performed in FIG. 3, one-side four-color printing is performed in FIG. 4, and two-side four-color printing is performed in FIGS. 5 and 6.

Figure 7:
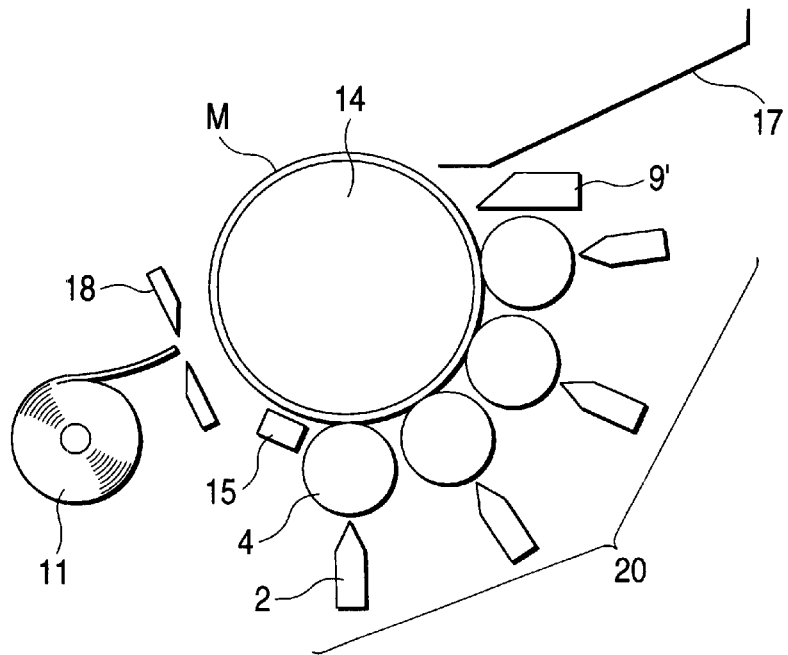
FIG. 7 is an entire construction view schematically showing a one-side four-color printing apparatus for performing the printing by cutting a rolled printing medium and winding it around a drawing drum, which is another example of the ink jet printing apparatus of the present invention.
Figure 8:
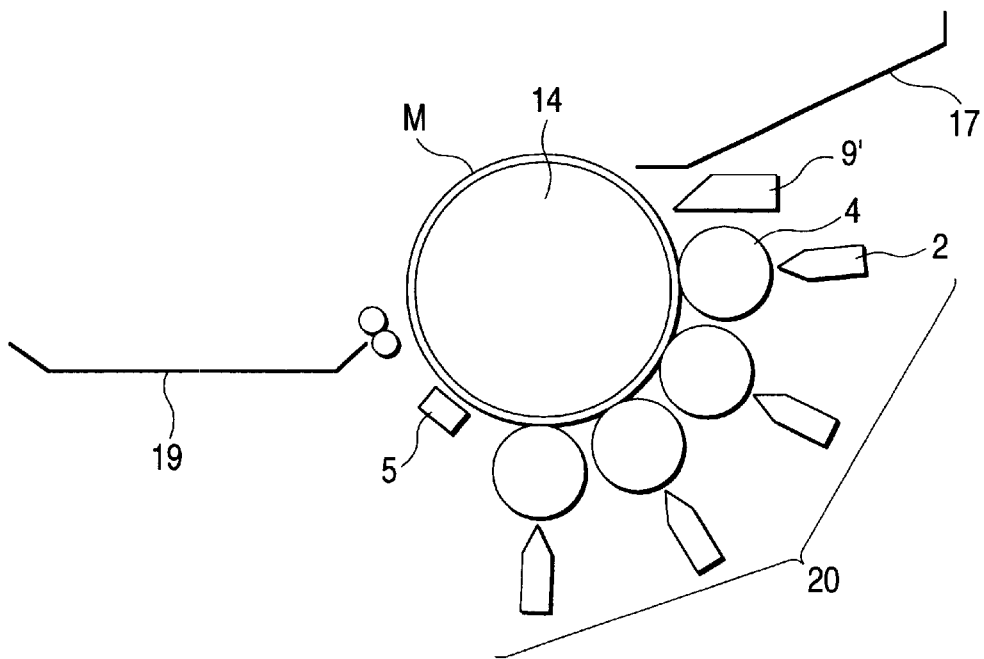
FIG. 8 is an entire construction view schematically showing a printing apparatus using a sheet-like recording medium, which is another example of the ink jet printing apparatus of the present invention.

In the construction example of the printing apparatus of FIG. 7, a rolled printing medium is cut and wound around a transportation medium and the printing medium is moved along the rotation of the transportation drum, thereby performing the transfer and fixing of the image, and in FIG. 8, a sheet-like recording medium is used.

Figure 9:
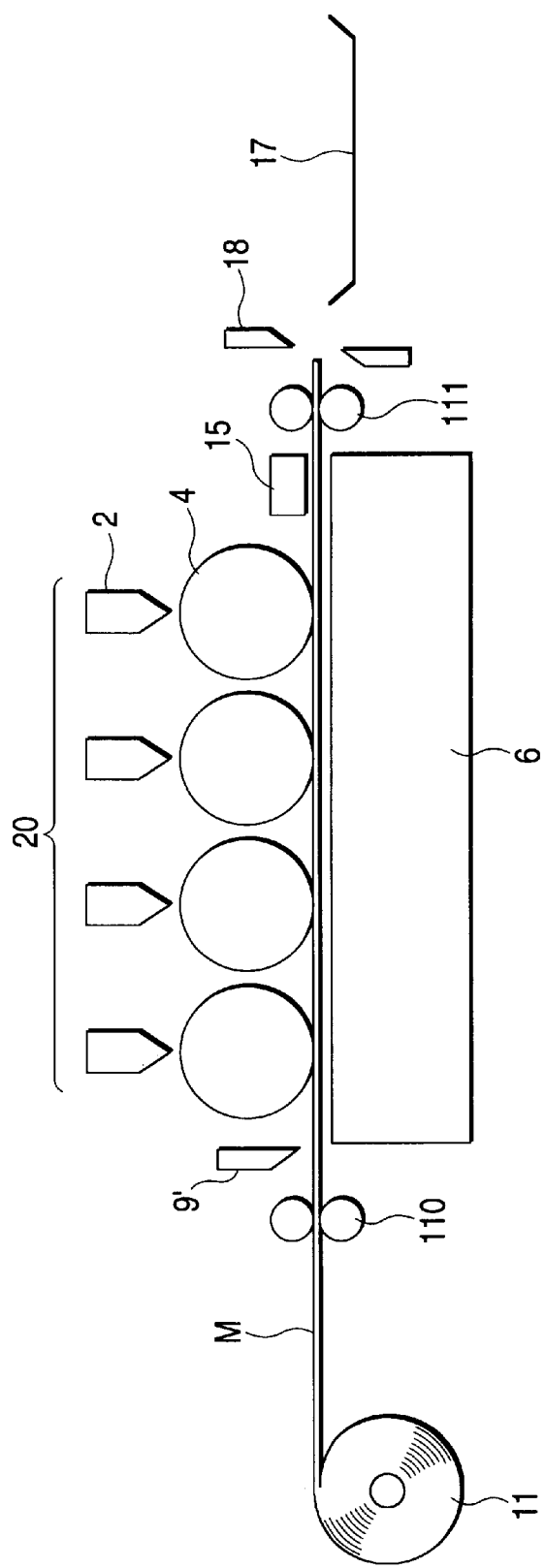
FIG. 9 is an entire construction view schematically showing a four-color printing apparatus for performing the drawing by traveling a rolled printing medium while interposing and holding it between capstan rollers, which is another example of the ink jet printing apparatus of the present invention.
Figure 10:
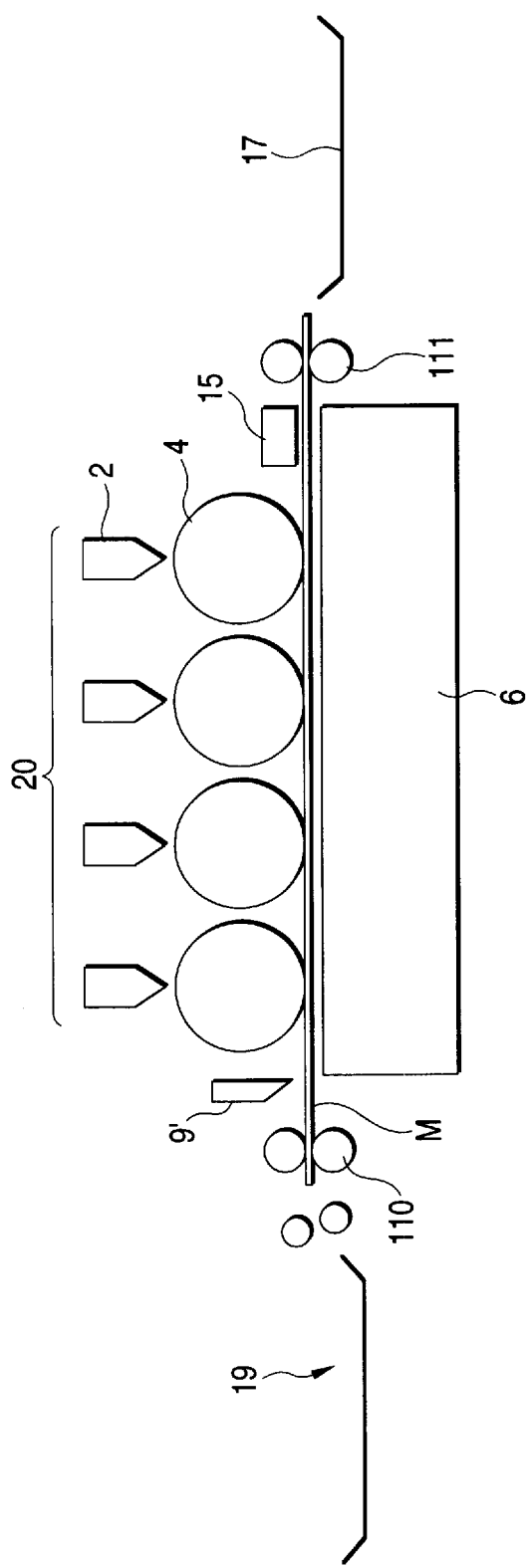
FIG. 10 is an entire construction view schematically showing a printing apparatus for performing the drawing by travelling a sheet-like recording medium while interposing and holding it between capstan rollers, which is another example of the ink jet printing apparatus of the present invention.

On the other hand, FIGS. 9 and 10 each is a view schematically showing a construction example of a printing apparatus according to the present invention, where the transfer and fixing of an image are performed by running the printing medium while interposing and holding it between capstan rollers. Out of these schematic construction examples, a rolled printing medium is used in FIG. 9 and a sheet-like recording medium is used in FIG. 10.

Figure 11:
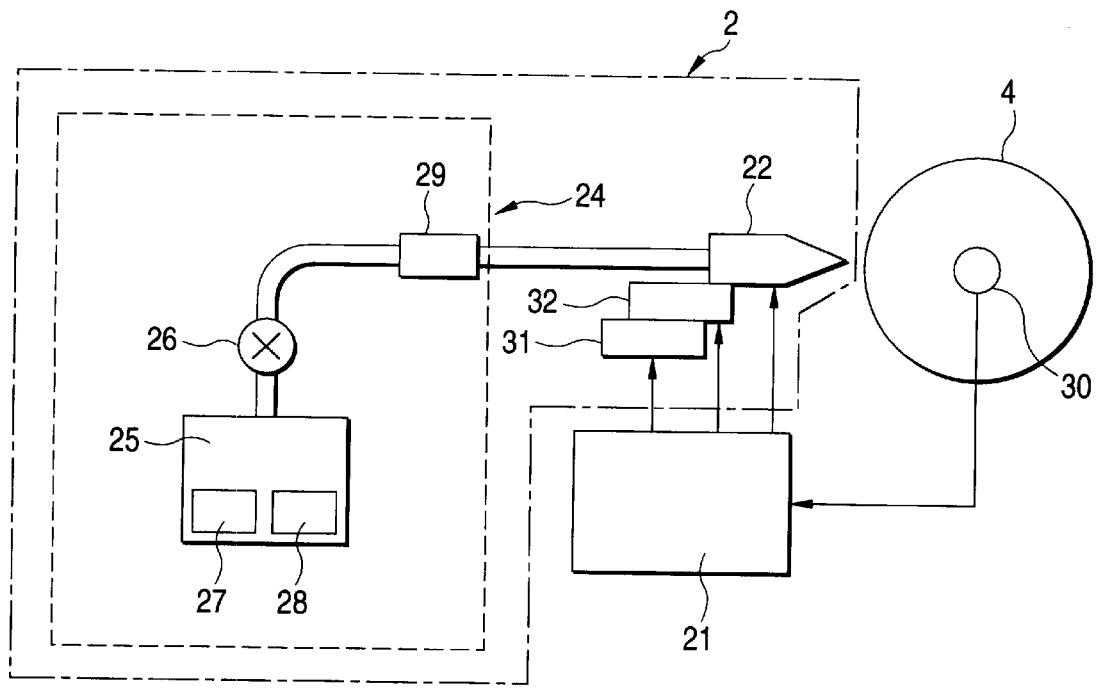
FIG. 11 is a schematic construction example of an ink jet drawing device for use in the ink jet printing apparatus of the present invention, including the control part of the ink jet drawing device, the ink feed part and the head-retreating or approximating mechanism.

FIG. 11 is a view schematically showing a construction example of the drawing unit including a control part, an ink feed part and a head-retreating or approximating mechanism. FIGS. 12 to 18 each is a view for explaining the ink jet drawing device of the drawing unit shown in FIG. 11.

Figure 3:
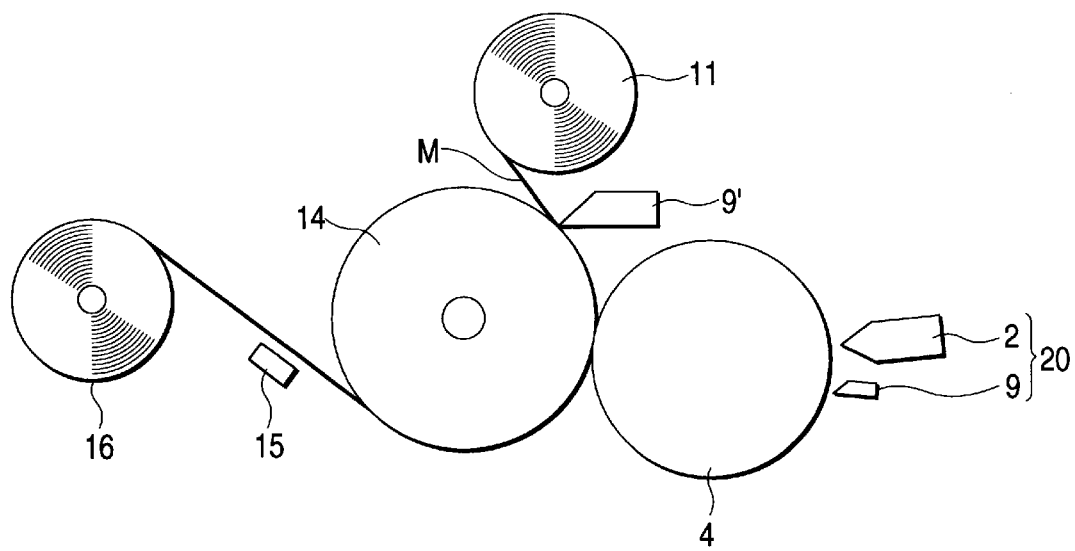
FIG. 3 is an entire construction view schematically showing a web-type apparatus for performing one-side monochromatic printing, which is one example of the ink jet printing apparatus of the present invention.

FIG. 3 is a view showing the entire construction of a printing apparatus for performing one-side one-color printing on a rolled printing medium. The ink jet printing apparatus (hereinafter sometimes referred to as "printing apparatus") shown in the Figure is constructed by a feed roll 11 of feeding a rolled printing medium, a dust/paper dust-removing device 9' of removing dusts and paper dusts on the printing medium, an ink jet drawing device 2, a drawing drum 4, a dust/paper dust removing device 9 of removing dusts and paper dusts on the drawing drum, a printing medium transportation drum with a heating device for transporting a printing medium M (hereinafter referred to as "transportation drum") 14, a fixing apparatus 15 and a printing medium take-up roll 16.

For the dust/paper dust-removing means 9' of removing dusts or paper dusts on a printing medium, a known non-contact method such as suction removal, blowing removal and electrostatic removal, or a contact method by a brush, a roller or the like may be used. In the present invention, air suction, air blowing or a combination thereof is preferably used.

The transportation drum 14 at the same time has a function as a heat roller 3 of FIG. 1. More specifically, a heater is self-contained inside the transportation drum 14 and the drum surface is heated under control to keep the printing medium M at a temperature of facilitating the transfer (usually, the temperature is preferably on the order of 40 to 120° C.). The temperature elevation of the drawing drum 4 is also effective in the improvement of the quality of the drawn image. In addition, by controlling the drum temperature constant, the physical values of the ink droplet ejected on the drawing drum can be controlled and therefore, stable and homogeneous dot formation can be attained. In order to keep the drum at a constant temperature, cooling means is preferably provided together. During the time period of the drawing unit 20 ejecting an oil-based ink on the surface of the drawing drum 4 to form an image, the transportation drum 14 is separated from the drawing unit 20.

The transferred image on the printing medium M is fixed by a fixing apparatus 15 and the printed printing medium is taken up by a printing medium take-up roll 16.

As such, in the ink jet printing apparatus, the dust-removing means 9 removes the dusts present on the surface of the drawing drum 4 and the ink jet drawing device 2 imagewise ejects an oil-based ink toward the surface of the drawing drum 4 from the ink ejection part (described later) to form an image on the surface of the drawing drum 4.

On the other hand, the printing medium M delivered from the feed roll 11 is tensioned by the driving of the printing medium take-up roll, which prevents the printing medium web from vibrating and suffering damages caused by contacting with the ink jet drawing device at the time of drawing an image. The dusts on the printing medium itself are removed by the dust/paper dust-removing device 9' and thereafter, the printing medium is transported on the transportation drum 14.

Then, the drawing drum 4 having formed thereon an image is rotated in the printing medium direction, whereby the oil-based ink image formed on the surface of the drawing drum 4 is contacted with and transferred onto the printing medium M transported on the transportation drum 14.

The ink jet recording device 2 forms a drawn image, as shown in FIG. 11, by ejecting an oil-based ink on the drawing drum 4 in correspondence to the image data sent from the image data arithmetic and control part 21 using the electric field formed between the ejection head 22 and the drawing drum 4.

The image data arithmetic and control part 21 receives image data from an image scanner, a magnetic disc device, an image data transmission device or the like, performs color separation, partitions and computes the separated data into an appropriate number of picture elements or an appropriate number of gradations, and shares the results to respective heads.

Furthermore, since the oil-based ink image is drawn as a dotted image using the ink jet ejection head 22 (described later; see, FIG. 12) of the ink jet recording device 2, the halftone dot area ratio is also computed.

As described later, in the image data arithmetic and control part 21, the movement of the ink jet ejection head 22 and the timing of ejecting the oil-based ink are controlled and if desired, the timing of operating the drawing drum is also controlled.

The image data from a magnetic disc device or the like is given to the image data arithmetic and control part 21 and according to the input image data, the image data arithmetic and control part 21 computes the position of ejecting an oil-based ink and the halftone dot area ratio at that position. These arithmetic data are once stored in a buffer. The image data arithmetic and control part 21 approximates the ejection head 22 to the position proximate to the drawing drum 4 using a head-retreating or approximating device 31. The ejection head 22 and the surface of the drawing drum are kept at a predetermined distance during the drawing using mechanical distance-controlling member such as knock roller or under the control of the head-retreating or approximating device based on the signals from an optical distance detector. For the ejection head 22, a single channel head, a multi-channel head or a full line head may be used.

In the case where a single channel head or a multi-channel head is used as the ejection head, the head is disposed such that the ejection parts are arrayed in a direction right angled to the rotational axis direction of the drawing drum, and the image is formed while performing the sub-scanning by the movement of ejection head in the axial direction of the drawing drum and performing the main scanning by the rotation of the drawing drum. The movements of the drawing drum and the ejection head are controlled by the image data arithmetic and control part 21 and the ejection head ejects an oil-based ink on the printing medium based on the ejection position and the halftone dot area ratio obtained by the computation. By this, a halftone image is drawn by the oil-based ink according to the variable density of the printing original. This operation continues until a predetermined ink image is formed on the drawing drum.

On the other hand, in the case where the ejection head 22 is a full line head having almost the same length as the width of the drawing drum, the head is disposed to array the ejection parts at a right angle to the rotating direction of the drawing drum and an oil-based ink image is formed by rotating the drawing drum and thereby passing the surface of the drawing drum through the drawing part.

After the completion of image formation, if desired, the ejection head 22 is retreated to come apart from the position proximate to the drawing drum so as to protect the ejection head 22. At this time, only the ejection head 22 may be retreated or approximated but the ejection head 22 and the ink feed part 24 may be retreated or approximated together.

This retreating or approximating means is operated to separate the ejection head at least 500 μm or more apart from the drawing drum except for the drawing time. The retreating/approximating operation may be performed by a slide system or by a pendulum system of fixing the head using an arm fixed to a certain axis and moving the arm around the axis. By retreating the ejection head at the non-drawing time, the ejection head can be protected from the physical breakage or contamination and can have a long life.

The printing medium M after the transfer is further transported to the fixing apparatus 15 by the transportation drum 14 and the transferred image on the printing medium M is fixed to the printing medium M using the fixing apparatus 15. By accelerating the swift fixing of the ejected ink droplets on the printing medium, the blurring can be more successfully prevented. After the fixing the printed printing medium is taken up by a printing medium take-up roll 16.

For fixing the ink, known means such as heat-fixing or solvent fixing may be used. In the heat-fixing, irradiation of an infrared lamp, a halogen lamp or a xenon flash lamp, hot air fixing using a heater, or heat-roller fixing is generally employed.

The flash fixing using a xenon lamp or the like is known as a fixing method of electrophotographic toner and this is advantageous in that the fixing can be performed within a short time. In the case of using a laminate sheet, the water content inside the paper abruptly evaporates due to the abrupt elevation of the temperature and a phenomenon called blister of generating asperities on the paper surface takes place. Therefore, for preventing the blister, it is preferred to dispose a plurality of fixing machines and to vary at least one of: the distance from the respective fixing machine to the recording medium; and the electric power supplied to the respective fixing machine, so as to gradually elevate the paper temperature.

In the solvent fixing, a solvent capable of dissolving the resin components in the ink, such as methanol or ethyl acetate, is sprayed or the printing medium is exposed to the solvent vapor while recovering excess solvent vapor.

At least in the process from the formation of an oil-based ink image by the ejection head 22 until the fixing by the fixing apparatus 5, the formed image is preferably kept not to come into contact with any thing.

Figure 4:
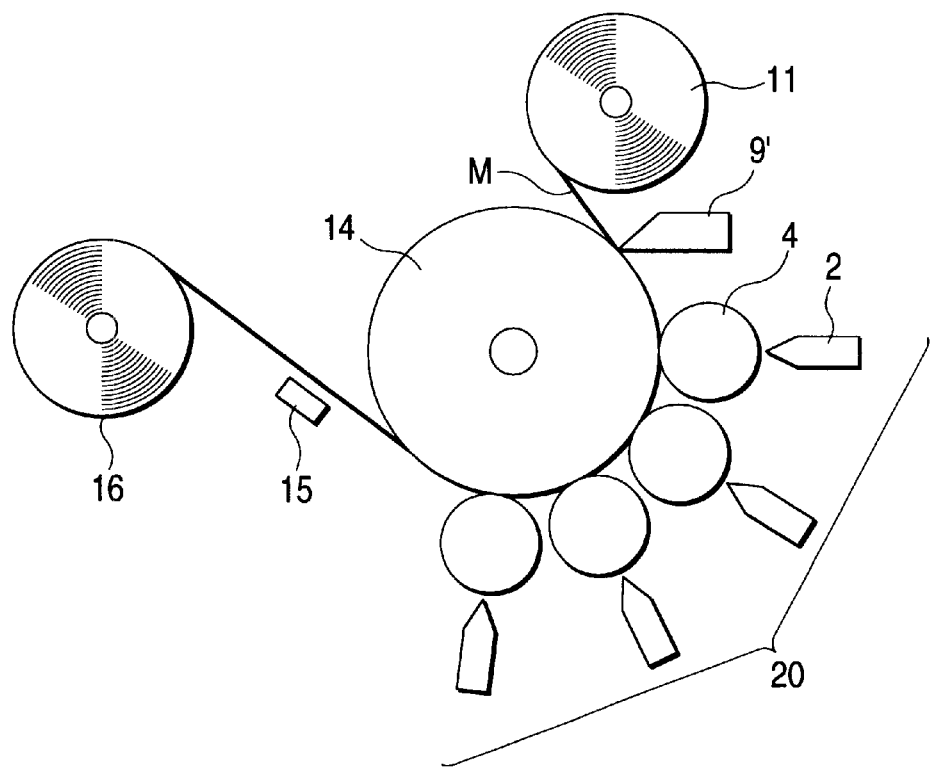
FIG. 4 is an entire construction view schematically showing the web-type apparatus for performing one-side four-color printing, which is another example of the ink jet printing apparatus of the present invention.
Figure 5:
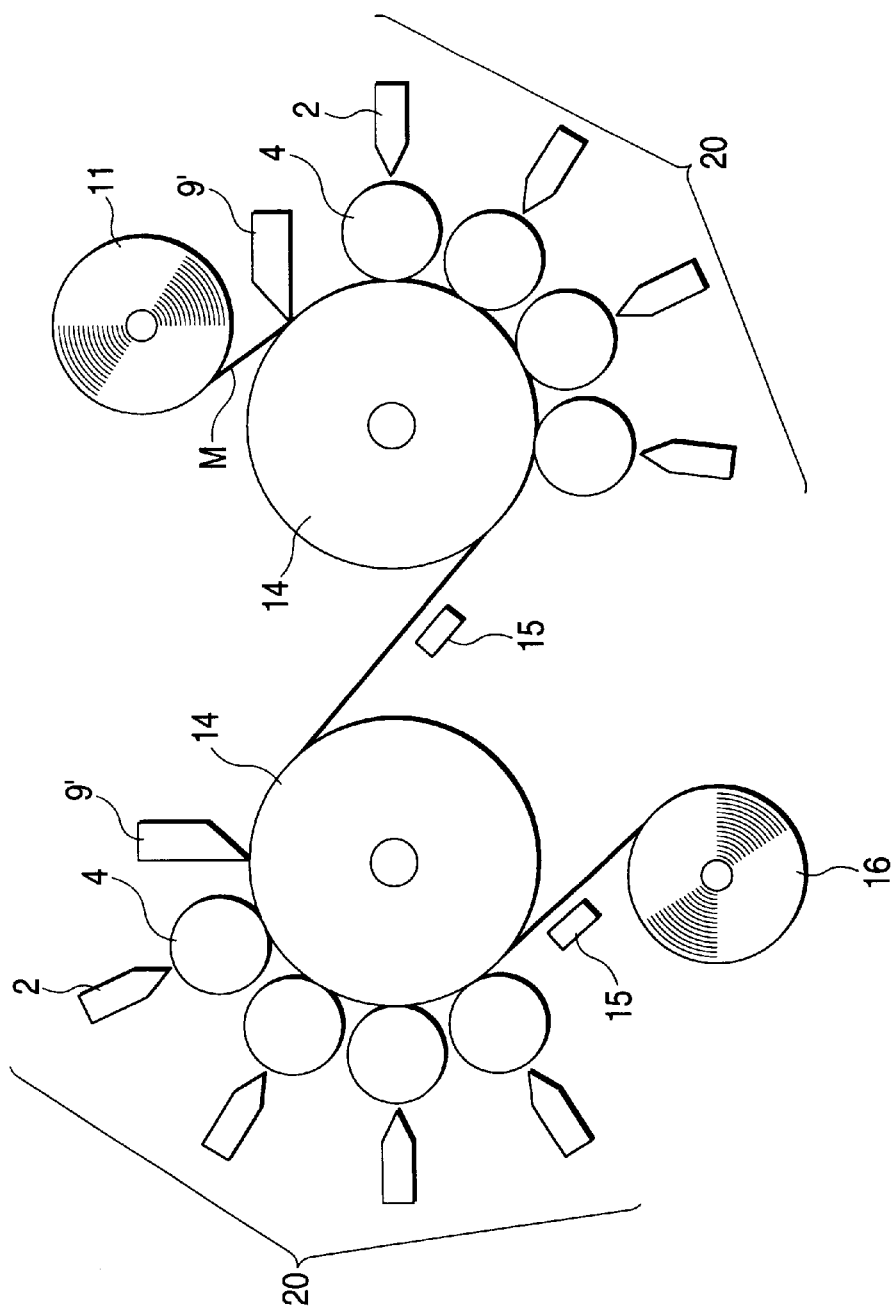
FIG. 5 is an entire construction view schematically showing a two-side four-color printing apparatus, which is another example of the ink jet printing apparatus of the present invention.
Figure 6:
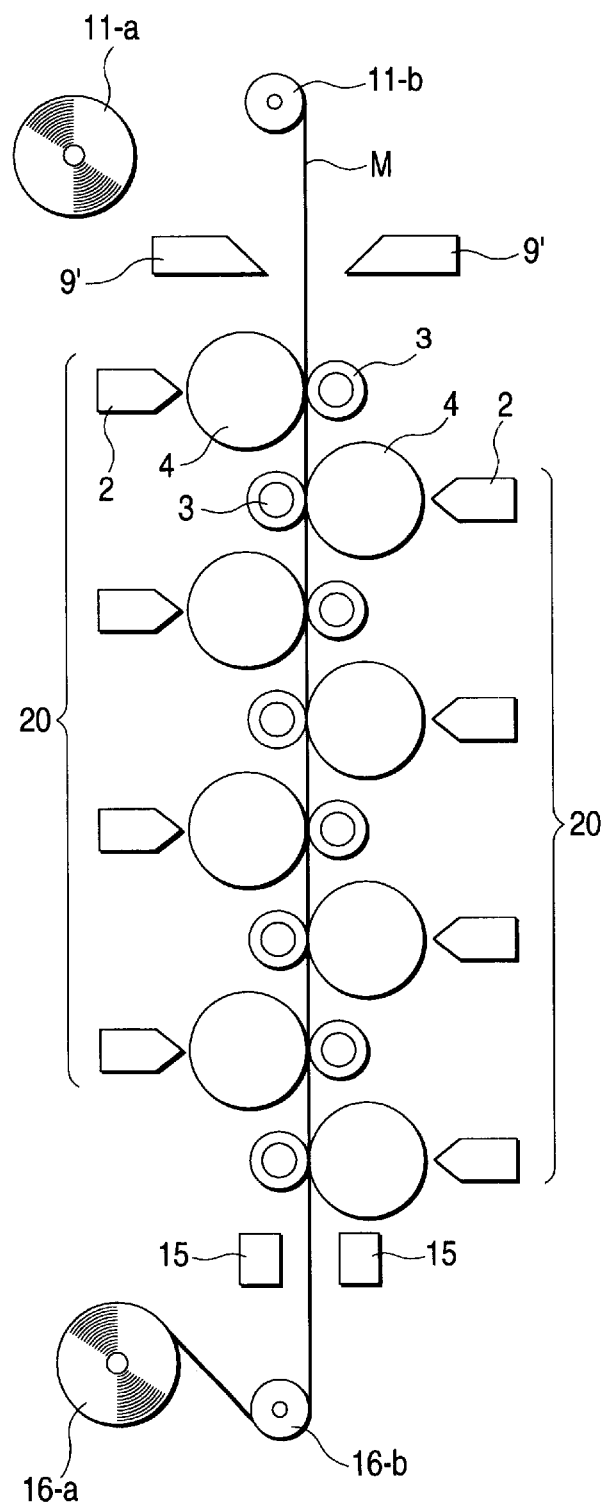
FIG. 6 is an entire construction view schematically showing a two-side four-color printing apparatus, which is another example of the ink jet printing apparatus of the present invention.

FIGS. 4 to 6 each is a construction example of a one-side four-color printing apparatus or a two-side four-color printing apparatus.

FIG. 4 shows a one-side four-color printing apparatus. From a feed roll 11 of a rolled printing medium, a printing medium M is transferred on a transportation drum 14 after dusts and paper dusts on the printing medium are removed by the dust/paper dust-removing device 9'. On the other hand, an ink jet drawing device 2 ejects an oil-based ink on the surface of a drawing drum 4 after the cleaning thereof by a dust/paper dust-removing device 9, and forms an image. The drawing drum 4 having formed thereon an image rotates to contact with the printing medium M on the transportation drum 14. By the heating and compression from the transportation drum 14, the image on the drawing drum is transferred onto the printing medium M. After the image is thus transferred onto the printing medium M by the drawing unit 20 according to the present invention, a second color image is transferred onto the printing medium M by the second color drawing unit 20, then a third color image is transferred onto the printing medium M by the third color drawing unit 20 and a fourth color image is transferred onto the printing medium M by the fourth color drawing unit 20. Thereafter, the images are fixed on the printing medium M using a fixing apparatus 15 and then the printing medium is taken up by a printing medium take-up roll 16.

As such, according to the present invention, an image is first formed on a drawing drum ensuring very high precision of the ink ejection position and thereafter, the image is transferred, so that a high-precision image can be formed.

A construction example of a four-color printing apparatus is described here, however, the present invention is not limited thereto and the number of colors are freely selected depending on the case.

In FIG. 5, the one-side four-color printing apparatus of FIG. 4 is disposed at front and back sides of the printing medium M and also in this case, a high-precision image is transferred onto the printing medium M by the drawing unit 20 every each color. By this, two-side four-color printing of a high-precision image can be attained.

In FIG. 6, each pair of small heat rollers 3 are disposed to face each other in respective drawing unit 20 in place of the large-size transportation drums 14 of FIG. 5. Others are the same as those in the two-side four-color printing apparatus of FIG. 5. That is, also in this case, a high-precision image is transferred onto the printing medium M by the drawing medium 20 every each color and therefore, two-side four-color printing of a high-precision image can be attained.

FIGS. 7 and 8 each is another construction example according to the present invention for explaining a printing apparatus where an automatic discharge device 17 is provided and the printing medium M is used by winding it around a transportation drum 14. In FIG. 8, an automatic feed device 19 is further provided and a sheet-like printing medium M is used.

The present invention is described here by referring to the construction example of an apparatus using a rolled printing medium M of FIG. 7.

The printing medium M is delivered from the printing medium feed roll 11, cut into an arbitrary size by a cutter 18, cleaned by a paper dust-removing device 9' and then fixed on a transportation drum 14. At this time, the printing medium M may be closely fixed onto the transportation drum 14 by a known mechanical method such as sheet head/edge gripping device or air suction device, or by an electrostatic method, so that the sheet edge can be prevented from fluttering to fly paper dusts at the transfer or the paper sheet can be prevented from contacting to cause damages.

In the drawing unit 22, the ejection head (FIG. 11) of the ink jet drawing device 22 is preferably separated from the drawing drum 4 during the time period of not performing the drawing, so that troubles such as contact damage can be prevented from occurring on the ink jet drawing device. At the time of drawing an image, the ejection head is approximated to the drawing drum 4.

The ejection head which can be used is a single channel head, a multi-channel head or a full line head, and the main scanning is performed by the rotation of the drawing drum 14. In the case of a multi-channel head or a full line head having a plurality of ejection parts, the head is disposed to array the ejection parts in the axial direction of the drawing drum 14.

In the case of a single channel head or a multi-channel head, the ejection head 22 is continuously or sequentially moved in the direction parallel to the axis of the drawing drum by the image data arithmetic and control part 21 and ejects there an oil-based ink on the surface of the drawing drum 4 based on the ejection position and the halftone dot area ratio obtained by the computation of the image data arithmetic and control part 21. By this, a halftone image is drawn by the oil-based ink according to the variable density of the printing original. This operation continues until a predetermined oil-based ink image is formed on the drawing drum 4.

On the other hand, in the case where the ejection head 22 is a full line head having almost the same length as the width of the drawing drum 4, an oil-based ink image is formed on the drawing drum 4 by the one rotation of the drawing drum 4. As such, the main scanning is performed by the rotation of the drawing drum 4, so that the positional precision in the main scan direction can be elevated and the drawing can be performed at a high speed.

Together with the rotation of the drawing drum 4, the image formed on the drawing drum 4 comes into contact with the printing medium M closely fixed on the transportation drum 14. Due to the heating and compression from the transportation drum 14, the image on the drawing drum 4 is transferred onto the printing medium M. After the image is thus transferred onto the printing medium M by the drawing unit 20 according to the present invention, a second color image is transferred onto the printing medium M by the second color drawing unit 20, then a third color image is transferred onto the printing medium M by the third color drawing unit 20 and a fourth color image is transferred onto the printing medium M by the fourth color drawing unit 20. Thereafter, the images are fixed on the printing medium M using a fixing apparatus 15 and then the printing medium is discharged by an automatic discharge device 17.

As such, according to the present invention, an image is first formed on a drawing drum ensuring very high precision of the ink ejection position and thereafter, the image is transferred onto the printing medium M, so that a high-precision image can be formed.

A construction example of a four-color printing apparatus is described here, however, the present invention is not limited thereto and the number of colors, the one-side or two-side printing and the construction of the device are freely selected depending on the case. After a plurality of color images are formed on one drawing drum, these images may be transferred all at once and in this case, more compact design and lower cost may be realized.

FIGS. 9 and 10 each is a view schematically showing a construction example of a one-side four-color printing apparatus where an image is formed on a drawing drum 4 by a drawing device 2 of the drawing unit 20 according to the present invention, a printing medium M is traveled while interposing and holding it between capstan rollers according to the present invention, and thereby the transfer on the printing medium M and the fixing are performed. Of these schematic views showing a construction example, FIG. 9 is a printing apparatus using a rolled printing medium and FIG. 10 is a printing apparatus using a sheet-like printing medium.

The present invention is described here by referring to the entire construction example of an apparatus for performing one-side four-color printing on a rolled printing medium M shown in FIG. 9.

The printing medium M is delivered from the printing medium feed roll 11, cleaned by a paper dust-removing device 9' and transported beneath the drawing rum 4 using capstan rollers 110. At this time, a printing medium guiding means not shown may be provided, if desired, so that the head or edge of the printing medium M can be prevented from fluttering to fly paper dusts or the paper sheet can be prevented from contacting with the drawing drum 4 having a delicate surface to cause damages thereon. Also, means of preventing loosening of the printing medium M only in the periphery of the transfer position may be provided, so that by actuating this at least at the time of transfer, the printing medium M can be prevented from contacting with the drawing drum 4. To speak specifically, for example, a method of disposing a presser roller upstream and downstream the transfer position may be used.

During the time period of not performing the transfer, the printing medium M is preferably is separated from the drawing drum 4, so that troubles such as contact damage can be effectively prevented from the generation on the precise surface of the drawing drum 4.

Similarly, during the time period of not performing the drawing, an ink jet drawing device 2 is preferably separated from the drawing drum 4, so that troubles such as contact damage can be effectively prevented from occurring on the ink jet drawing device.

Using data partitioned and computed into appropriate number of picture elements and number of gradations by the image data arithmetic and control part (21 of FIG. 11), an image is drawn on the surface of the drawing drum 4 by the ink jet drawing device 2.

The image data from a magnetic disc device or the like is sent to the image data arithmetic and control part 21 of FIG. 11 and according to the input image data, the image data arithmetic and control part 21 computes the position of ejecting an oil-based ink and the halftone dot area ratio at that position. These arithmetic data are once stored in a buffer.

The image data arithmetic and control part 21 moves the ink jet ejection head 22, controls the timing of ejecting an oil-based ink and the timing of operating the capstan rollers and if desired, approximates the ejection head 22 to the position proximate to the drawing drum 4 using a head-retreating or approximating device 31. The ejection head 22 and the surface of the drawing drum 4 are kept at a predetermined distance during the drawing using mechanical distance-controlling member such as knock roller or under the control of the head-retreating or approximating device based on the signals from an optical distance detector. By virtue of this control of distance, even when the printing apparatus is vibrated, good printing can be performed without causing any change in the dot size.

For the ejection head 22, a single channel head, a multi-channel head or a full line head may be used and the main scanning is performed by the rotation of the drawing drum 4. In the case of a multi-channel head having a plurality of ejection parts, the head is disposed such that the ejection parts are arrayed in parallel to the rotating direction of the drawing drum. Furthermore, in the case of a single channel head or a multi-channel head, the ejection head 22 is moved in the direction at a right angle to the rotating direction of the drawing drum 4 by the image data arithmetic and control part 21 and ejects an oil-based ink based on the ejection position and the halftone dot area ratio obtained by the computation. By this, a halftone image is drawn by the oil-based ink according to the variable density of the printing original. This operation continues until a predetermined oil-based ink image is formed on the surface of the drawing drum 4. On the other hand, in the case where the ejection head 22 is a full line head having almost the same length as the width of the drawing drum 4, the head is disposed to array the ejection parts at a right angle to the rotating direction of the drawing drum 4 and an oil-based ink image is formed by passing the drawing drum 4 through the drawing part.

The formed oil-based ink image is then transported between the drawing drum 4 and a heating and compression device 6, whereby the image of the drawing drum 4 is transferred onto the printing medium M.

After the transfer of image, the printing medium M is fixed by a fixing apparatus 15 and transported toward a sheet cuter 18 by capstan rollers. The printing medium M is cut by the sheet cutter and then discharged by an automatic discharge device 17.

In FIG. 9, a rolled printing medium M is cut and therefore, the sheet cutter 18 is provided upstream the automatic discharge device 17, however, the sheet cutter can be disposed at any appropriate position.

A construction example of a one-side four-color printing press is described, however, the present invention is not limited thereto and the number of colors and the one-side or two-side printing may be freely selected depending on the case.

The ink jet drawing device is described in detail below by referring to FIG. 11.

As shown in FIG. 11, the ink jet drawing device 2 for use in the ink jet printing process of the present invention comprises an ejection head 22 and an ink feed part 24.

The ink feed part 24 further comprises an ink tank 25, an ink feed device 26 and ink concentration-controlling member 29 and in the ink tank, stirring member 27 and ink temperature-controlling member 28 are contained. The ink may be circulated within the head and in this case, the ink feed part additionally has a recovery and circulating function. The stirring member 27 prevents the precipitation and coagulation of solid contents in the ink. For the stirring member, a rotary blade, an ultrasonic vibrator and a circulating pump may be used and these are used individually or in combination. The ink temperature-controlling member 28 is disposed so that the physical properties of ink or the dot size can be prevented from varying by the change of the ambient temperature and a high-quality image can be stably formed. For the ink temperature-controlling member, a known method may be used, for example, a method where a heat-generating element or a cooling element such as heater or Peltier device is disposed within the ink tank together with the stirring member and the temperature distribution within the tank is controlled constant by a temperature sensor such as thermostat. The ink temperature within the ink tank is preferably from 15 to 60° C., more preferably from 20 to 50° C. The stirring member for maintaining the temperature distribution within the tank to be constant may be used in combination with the stirring member used for the purpose of preventing the precipitation or coagulation of solid components in ink. The drawing and printing apparatus of the present invention has ink concentration-controlling member 29 for achieving high-quality drawing. The ink concentration is controlled by measuring the physical properties, for example, by means of optical detection, measurement of electrical conductivity or measurement of viscosity, or by counting the number of sheets subjected to the drawing. In the case of controlling the ink concentration by measuring the physical properties, an optical detector, an electrical conductivity-measuring meter and a viscosity-measuring meter are provided individually or in combination within the ink tank or on the path for passing ink and by the output signal thereof, the feeding to the ink tank from a concentrated ink tank (not shown) for replenishment or from a diluting ink carrier tank is controlled. In the case of controlling the ink concentration by counting the number of sheets subjected to the drawing, the feeding is controlled by the number of sheets printed and the frequency of printing.

The image data arithmetic and control part 21 computes the input image data, as described above, or takes in the timing pulse from an encoder 30 disposed in the drawing drum or capstan roller and drives the head according to the timing pulse. At the time of performing the drawing by the ink jet drawing device, the drawing drum is driven using high-precision driving means. To speak specifically, for example, a method of driving the drawing drum while decelerating the output from a high-precision motor using a high-precision gear or steel-belt may be used. By using these means individually or in combination, high-quality drawing can be attained.

The ejection head is described below by referring to FIGS. 12 to 16, however, the present invention is not limited thereto.

Figure 12:
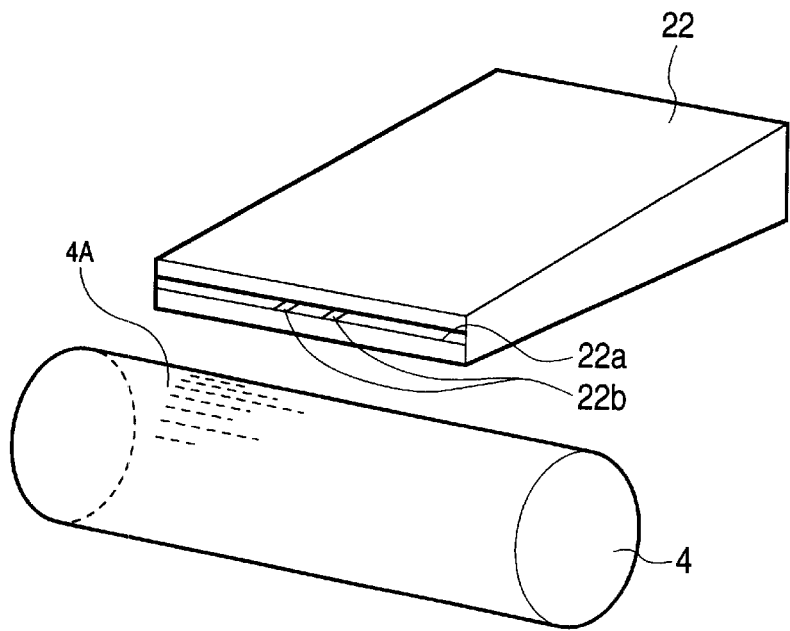
FIG. 12 is a view for explaining the ejecting head for use in the ink jet drawing device of FIG. 11.
Figure 13:
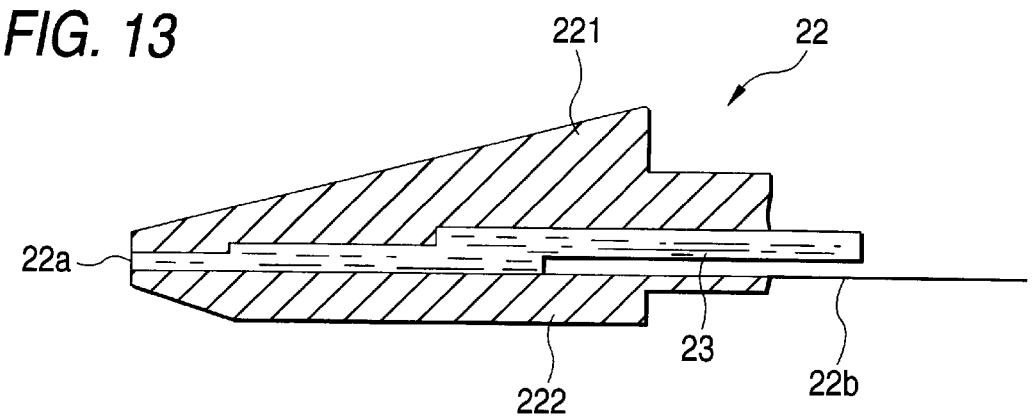
FIG. 13 is a view for explaining the enlarged cross section of the ejecting head of FIG. 12.

FIGS. 12 and 13 each is a view showing one example of the head provided in the ink jet drawing device. The ejection head 22 has a slit between an upper unit 221 and a lower unit 222 each comprising an insulating substrate, and the distal end of the slit works out to an ejection slit 22a. Within the slit, an ejection electrode 22b is disposed and the slit is filled with an ink 23 fed from the ink feed device. Examples of the insulating substrate which can be used include plastics, glass and ceramics. The ejection electrode 22b is formed by a known method, for example, a method of subjecting the lower unit 222 comprising an insulating substrate to vapor deposition, sputtering or electroless plating with an electrically conductive material such as aluminum, nickel, chromium, gold and platinum, coating a photoresist thereon, exposing the photoresist through a predetermined electrode pattern mask, developing it to form a photoresist pattern of the ejection electrode 22b and etching the pattern, a method of mechanically removing the photoresist pattern or a method comprising a combination thereof.

In the ejection head 22, a voltage is applied to the ejection electrode 22b according to digital signals of the image pattern information. As shown in FIG. 12, the drawing drum 4 which works out to a counter electrode is provided to oppose the ejection electrode 22. By the application of a voltage, a circuit is formed between the ejection electrode 22b and the drawing drum 4 as a counter electrode and an oil-based ink 23 is ejected from the ejection slit 22a of the ejection head 22 to form an image on the surface of the drawing drum 4 working out to a counter electrode.

With respect to the width of the ejection electrode 22b, the tip thereof is preferably as narrow as possible to form a high-quality image. The specific numerical value varies according to the conditions such as applied voltage and physical properties of ink but the tip width is usually from 5 to 100 $\mu$m.

For example, a dot of 40 $\mu$m can be formed on the drawing drum by using an ejection electrode 22b having a tip in the width of 20 $\mu$m, providing a distance of 1.0 mm between the ejection electrode 22b and the drawing drum 4 working out to a counter electrode, and applying a voltage of 3 KV between these electrodes for 0.1 msec.

Figure 14:
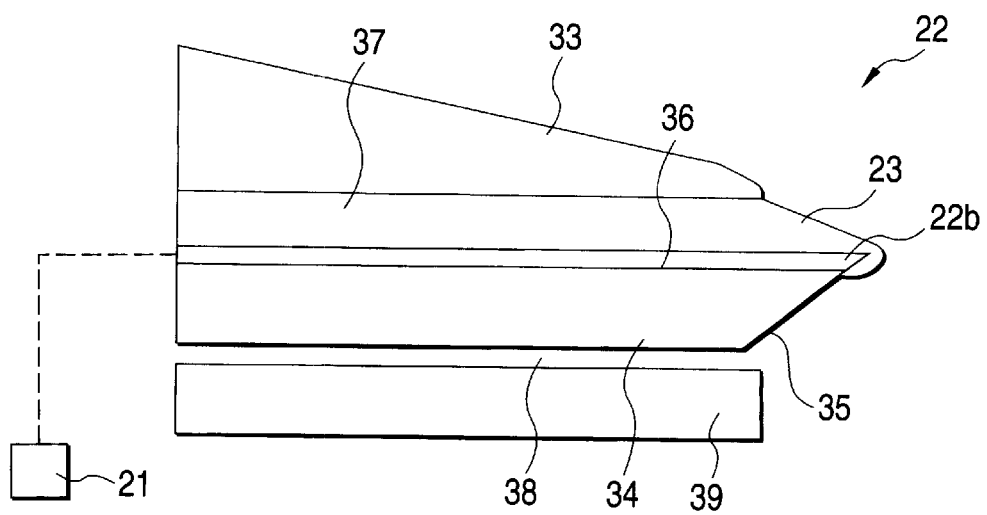
FIG. 14 is a cross-sectional view schematically showing the neighborhood of the ink ejection part of the ejection head according to another example.
Figure 15:
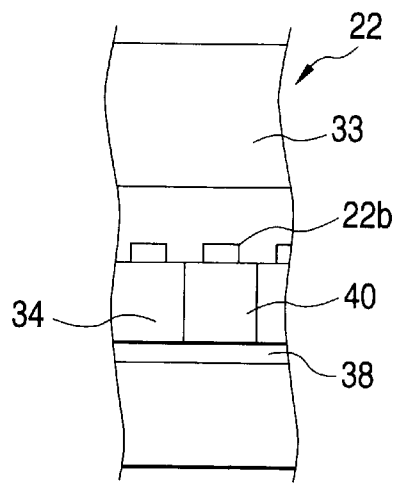
FIG. 15 is a front view schematically showing the neighborhood of the ink ejection part of the ejection head according to another example.

FIGS. 14 and 15 are a schematic cross-section view and a schematic front view, respectively, showing the vicinity of the ink ejection part in another example of the ejection head. In the Figures, 22 is an ejection head and this ejection head 22 has a first insulating substrate 33 having a tapered shape. Opposing the first insulating substrate 33, a second insulating substrate 34 is provided with a clearance and at the distal end of the second insulating member 34, an inclined face part 35 is formed. The first and second insulating substrates each is formed of, for example, plastic, glass or ceramic. On the upper face part 36 making an acute angle with respect to the inclined face part 35 of the second insulating substrate 34, a plurality of ejection electrodes 22b are provided as means for forming an electrostatic field. Respective tips of these multiple ejection electrodes 22b are extended to the vicinity of the distal end of the upper face part 36 and the tips each is projected ahead of the first insulating substrate 33 and forms an ejection part. Between the first and second insulating substrates 33 and 34, an ink inflow passage 37 is formed as means for feeding an ink 23 to the ejection part and in the lower side of the second insulating substrate 34, an ink recovery passage 38 is formed. The ejection electrode 22b is formed on the second insulating substrate 34 in the same manner as above by a known method using an electrically conducting material such as aluminum, nickel, chromium, gold and platinum. The individual electrodes 22b are constructed to lie in the electrically insulating state from each other. The tip of the ejection electrode 22b is preferably projected to the length of 2 mm or less from the distal end of the insulating substrate 33. The projection length is preferably within this range because if the projection length is excessively large, the ink meniscus does not reach the tip of the ejection part and the ink becomes difficult to jet out or the recording frequency decreases. The space between the first and second insulating substrates 33 and 34 is preferably from 0.1 to 3 mm. The space is preferably within this range because if the space is too small, the feeding and in turn ejection of the ink become difficult or the recording frequency decreases, whereas if the space is excessively large, the meniscus is not stabilized to cause unstable ejection. The ejection electrode 22 is connected to the image data arithmetic and control part 21 and in performing the recording, a voltage is applied to the ejection electrode based on the image information, the ink on the ejection electrode is ejected and an image is drawn on a drawing drum (not shown) disposed to oppose the ejection part. In the direction reverse to the ink droplet-ejecting direction of the ink inflow passage 37, ink feed means of the ink feed device is connected. On the surface opposite the ejection electrode-formed surface of the second insulating substrate 34, a backing 39 is provided to oppose the ejection electrode with a clearance. Between these ink feed means and backing, an ink recovery passage 38 is provided. The ink recovery passage 38 preferably has a space of 0.1 mm or more. The space is limited to this range because if the space is too small, the recovery of ink becomes difficult and ink leakage may occur. To the ink recovery passage 38, ink recovery member (not shown) of the ink feed device is connected. In the case where a uniform ink flow is necessary on the ejection part, a groove 40 may be provided between the ejection part and the ink recovery part. FIG. 15 is a schematic front view showing the vicinity of the ink ejection part of the ejection head. On the inclined face of the second insulating substrate 34, a plurality of grooves 40 are provided to extend from the vicinity of the boundary with the ejection electrode 22b toward the ink recovery passage 38. These grooves 40 in plurality are aligned in the array direction of the ejection electrodes 22b and each has a function of introducing a constant amount of ink in the vicinity of the tip of the ejection electrode through the opening in the ejection electrode 22b side by a capillary force according to the opening diameter and discharging the introduced ink to the ink recovery passage 38 and therefore, has a function of forming an ink flow having a constant liquid thickness in the vicinity of the ejection electrode tip. The shape of the groove 40 may be sufficient if the capillary force can work, but the width is preferably from 10 to 200 $\mu$m and the depth is preferably from 10 to 300 $\mu$m. The grooves 40 are provided in the number necessary for forming a uniform ink flow throughout the head.

With respect to the width of the ejection electrode 22, the tip of the ejection electrode is preferably as narrow as possible for forming a high-quality image. The specific numerical value varies depending on the applied voltage, physical properties of ink or the like, however, the tip width is usually from 5 to 100 $\mu$m.

Figure 16:
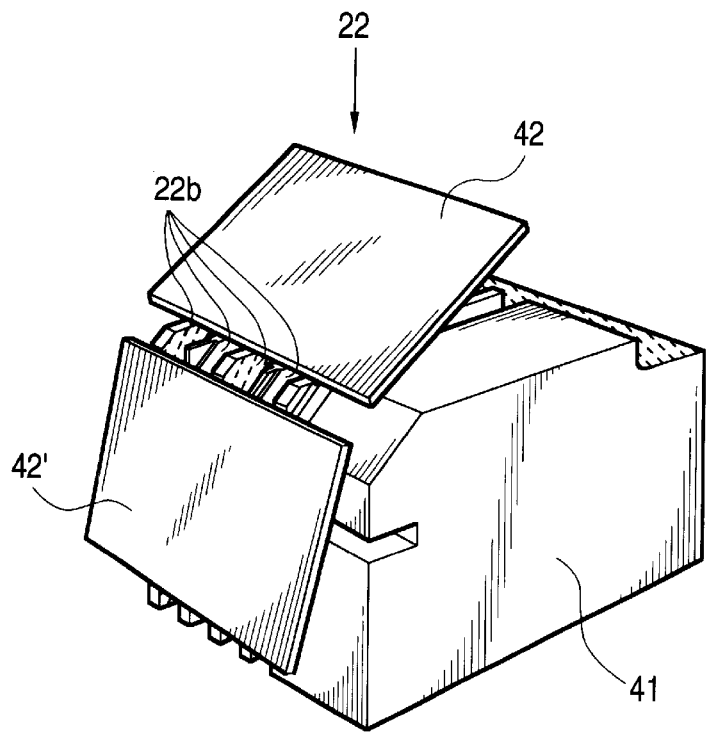
FIG. 16 is a schematic view showing only one part of the ejection head according to another example.
Figure 17:
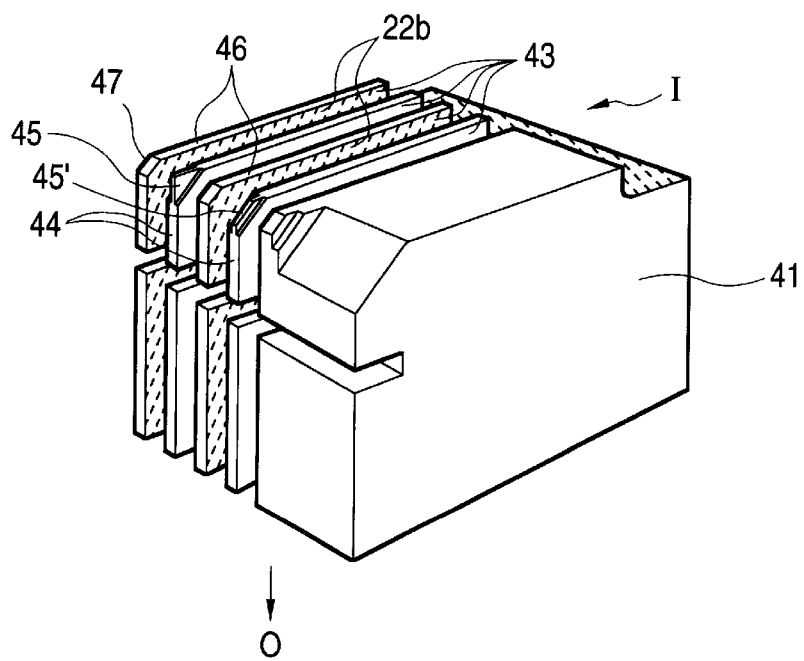
FIG. 17 is a schematic view of the recording head of FIG. 16 from which regulating plates 42 and 42' are removed.

FIGS. 16 and 17 each is a view showing another example of the ejection head used for practicing the present invention. FIG. 16 is a schematic view showing only a part of the head for the purpose of explanation. As shown in FIG. 16, the recording ejection head 22 comprises a head body 41 formed of an insulating material such as plastic, ceramic or glass, and meniscus regulating plates 42 and 42'. In the Figures, 22b is an ejection electrode for applying a voltage and thereby forming an electrostatic field in the ejection part. The head body is described in detail below by referring to FIG. 17 showing the head exclusive of the meniscus regulating plates 42 and 42'. In the head body 41, a plurality of ink grooves 43 for circulating the ink are provided perpendicularly to the edge of the head body. The shape of the ink groove 43 may be sufficient if the capillary force can work and thereby a uniform ink flow can be formed, but the width of the ink groove is preferably from 10 to 200 $\mu$m and the depth is preferably from 10 to 300 $\mu$m. Inside the ink groove 43, an ejection electrode 22b is provided. This ejection electrode 22b may be provided throughout or only on a part of the inner surface of the ink groove 43 of the head body 40 comprising an insulating material, using an electrically conducting material such as aluminum, nickel, chromium, gold and platinum by a known method similarly to the case of the above-described apparatus. The ejection electrodes are electrically isolated from each other. One cell is formed by two adjacent ink grooves and in the center thereof, a partition 44 is disposed. At the distal end of the partition, ejection parts 45, 45' are provided. The partition is reduced in the thickness and sharpened at the ejection parts 45, 45' as compared with other partition parts 44. Such a head body is manufactured using an insulating material block by a known method such as mechanical working, etching or molding. The thickness of the partition at the ejection part is preferably from 5 to 100 $\mu$m and the radius of curvature at the sharpened tip is preferably from 5 to 50 $\mu$m. The ejection part may be slightly chamfered as shown by 45'. In the Figures where only two cells are shown, the cells are divided by a partition 46 and the distal end 47 thereof is chambered to recede than the ejection parts 45, 45'. Into this head, an ink is flown through the ink groove from the I direction by the ink feed means of the ink feed device not shown to the ink to the ejection part. The excess ink is recovered toward the O direction by ink recovery member not shown, whereby a fresh ink is always fed to the ejection part. In this state, a voltage is applied according to the image information to the ejection electrodes provided to oppose the ejection part, as a result, an ink is ejected from the ejection parts to the surface of a drawing drum, whereby an image is formed on the surface of the drawing drum.

Figure 18:
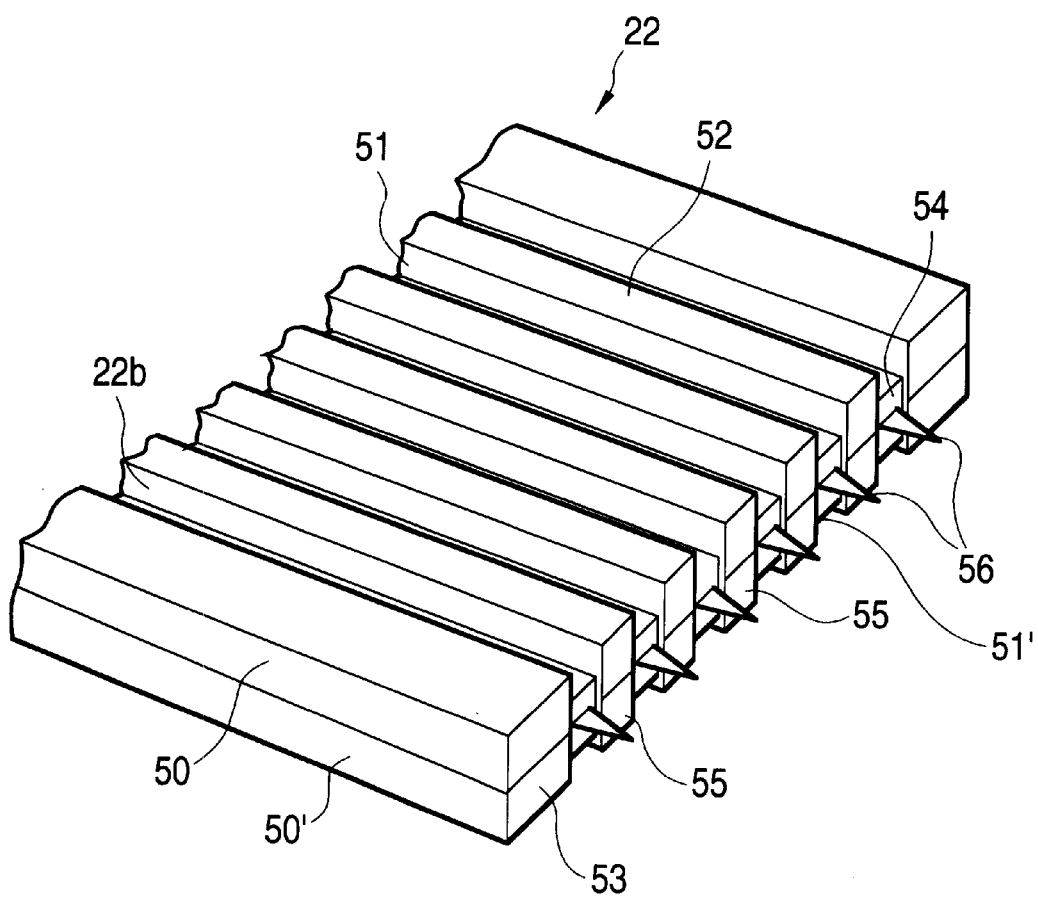
FIG. 18 is a schematic view showing only one part of the ejection head of the type having a pair of nearly rectangular plate-like support members.

FIG. 18 shows another example of the ejection head. As shown in FIG. 18, the ejection head 22 has a pair of support members 50 and 50' nearly in the rectangular shape. These support members 50 and 50' are formed of a plate-like material having an insulating property, such as plastic, glass or ceramic, and having a thickness of 1 to 10 mm. On one surface of each support member, a plurality of rectangular grooves 51, 51' extending in parallel to each other are formed according to the recording resolution. Each groove 51, 51' preferably has a width of 10 to 200 $\mu$m and a width of 10 to 300 $\mu$m. Throughout or on a part of the inside thereof, an ejection electrode 22 is formed. By forming a plurality of grooves 51, 51' on one surface of each support 50, 50' as such, a plurality of rectangular partitions 52 are necessarily provided between respective grooves 51. The support members 50 and 50' are combined such that the surfaces having not provided thereon the grooves 51, 51' face each other. Namely, the ejection head 22 has a plurality of grooves for passing an ink on the outer peripheral surfaces. The grooves 51 and 51' formed on respective support members 50 and 50' are connected through the rectangular part 54 of the ejection head 22 to correspond to one another. The rectangular parts 54 resultant from respective grooves being connected are each retreated by a predetermined distance (from 50 to 500 $\mu$m) from the upper end 53 of the ejection head 22. In other words, the upper end 55 of each partition 52 in both sides of each rectangular part 54 of respective support members 50 and 50' projects from the rectangular part 54. On each rectangular part 54, a guide projection 56 comprising an insulating material described above is provided to project therefrom. In the case of circulating an ink to the thus-constructed ejection head 22, an ink is fed to each rectangular part 54 through each groove 51 formed on the outer peripheral surface of one support member 50 and discharged through each groove 51' formed on the support member 50' in the opposite side. In this case, the ejection head 22 is inclined at a predetermined angle so as to enable smooth flow of the ink. That is, the ejection head 22 is inclined such that the ink feed side (support member 50) is positioned upward and the ink discharging side (support member 50') is positioned downward. When an ink is circulated to the ejection head 22, the ink passing through each rectangular part 54 comes to full wetting along each projection 56, and an ink meniscus is formed in the vicinity of the rectangular part 54 and the projection 56. In this state where ink meniscuses are formed independently from each other on respective rectangular parts 54, a voltage is applied to the ejection electrode 22b provided to oppose the ejection part, based on the image information, as a result, an ink is ejected from the ejection part toward the drawing drum and an image is formed on the surface of the drawing drum.

Here, a cover covering the grooves may be provided on the outer peripheral surface of each support member 50, 50' to form a piped ink passage on the outer peripheral surface of each support member 50, 50' and thereby forcedly circulate the ink through this ink passage. In this case, the ejection head 22 needs not be inclined.

The ejection head 22 shown in FIGS. 12 to 18 may contain a maintenance device such as head cleaning member, if desired. For example, in the case where the dormant state continues or where a trouble is generated in the image quality, means for wiping off the ejection head tip with a material having flexibility, such as scrub, brush or cloth, means for circulating only an ink solvent, means for feeding only an ink solvent, and means for suctioning the ejection part while circulating the ink solvent may be used. By using these means individually or in combination, good drawing state can be maintained. For preventing the solidification of the ink, a method of placing the ejection head within a cover filled with ink solvent steam, or a method of cooling the head part to suppress the evaporation of the ink solvent is also effective. If the contamination is more sticking, a method of enforcedly suctioning the ink from the ejection part, a method of enforcedly flowing an air, ink or ink solvent jet from the ink passage, or a method of applying an ultrasonic wave while dipping the head in an ink solvent is effective. These methods may be used individually or in combination.

Also, a cleaning member for cleaning the drawing drum 4 may be provided. The oil-based ink image formed on the drum surface is substantially as a whole transferred onto the printing medium and therefore, the cleaning of the drum can be performed by the help of dust-removing means.

The printing medium for use in the present invention is described below.

Examples of the printing medium include printing paper sheets commonly used, such as wood-free paper, fine coated paper and coated paper. In addition, paper sheets having thereon a resin film layer, such as polyolefin laminated paper, and plastic films such as polyester film, polystyrene film, vinyl chloride film and polyolefin film can also be used. Furthermore, plastic film or processed paper on the surface of which a metal is deposited or a metal foil is laminated can also be used.

The oil-based ink for use in the present invention is described below.

The oil-based ink for use in the present invention is obtained by dispersing at least colored particles in a non-aqueous solvent having an electric resistivity of $10^9$ $\Omega$cm or more and a dielectric constant of 3.5 or less.

The non-aqueous solvent having an electric resistivity of $10^9$ $\Omega$cm or more and a dielectric constant of 3.5 or less for use in the present invention is preferably a linear or branched aliphatic hydrocarbon, an alicyclic hydrocarbon, an aromatic hydrocarbon or a halogen substitution product of these hydrocarbons. Examples thereof include hexane, heptane, octane, isooctane, decane, isodecane, decalin, nonane, dodecane, isododecane, cyclohexane, cyclooctane, cyclodecane, benzene, toluene, xylene, mesitylene, Isoper C, Isoper E, Isoper G, Isoper H, Isoper L (Isoper: a trade name of Exxon Corp.), Shellsol 70, Shellsol 71 (Shellsol: a trade name of Shell Oil Corp.), Amsco OMS solvent, Amsco 460 solvent (Amsco: a trade name of American Mineral Spirits Co.), and silicone oil. These are used individually or in combination. The upper limit of the electric resistivity of the non-aqueous solvent is about $10^{16}$ $\Omega$cm and the lower limit of the dielectric constant is about 1.9.

The electric resistance of the non-aqueous solvent is specified to the above-described range because if the electric resistance is less than this range, colored particles or the like are not easily concentrated, the dots formed are colored thinly or bleeding is generated. The dielectric constant is specified to the above-described range because if the dielectric constant exceeds this range, the electric field is relaxed due to polarization of the solvent and thereby, the ink is poorly ejected.

In dispersing colored particles in the non-aqueous solvent, a coloring material itself may be dispersed as the disperse particle in a non-aqueous solvent or may be incorporated into a disperse resin particle for improving the fixing property. In the case of incorporating the coloring material into the resin particle, a method of covering the coloring material with a resin material of the disperse resin particle to form a resin-coated particle is generally used for a pigment and a method of coloring the disperse resin particle to form a colored particle is generally used for a dye.

The coloring material may be any as long as it is a pigment or a dye conventionally used for oil-based ink compositions or liquid developers for electrostatic photography.

With respect to the pigment, those commonly used in the technical field of printing may be used irrespective of an inorganic pigment or an organic pigment. Specific examples thereof include carbon black, cadmium red, molybdenum red, chrome yellow, cadmium yellow, titanium yellow, chromium oxide, viridian, cobalt green, ultramarine blue, Prussian blue, cobalt blue, azo-type pigments, phthalocyanine-type pigments, quinacridone-type pigments, isoindolinone-type pigments, dioxazine-type pigments, threne-type pigments, perylene-type pigments, perinone-type pigments, thioindigo-type pigments, quinophthalone-type pigments and metal complex pigments. These known pigments can be used without any particular limitation.

The dye is preferably an oil-soluble dye such as azo dye, metal complex salt dye, naphthol dye, anthraquinone dye, indigo dye, carbonium dye, quinoneimine dye, xanthene dye, aniline dye, quinoline dye, nitro dye, nitroso dye, benzoquinone dye, naphthoquinone dye, phthalocyanine dye and metallo-phthalocyanine dye.

These pigments and dyes may be used individually or in an appropriate combination. The coloring material is preferably contained in an amount of 0.01 to 5 wt % based on the entire ink.

In the oil-based ink for use in the present invention, a disperse resin particle for improving the fixing property of the dye after the printing is preferably contained together with the colored particle.

The resin particle dispersed in the non-aqueous solvent may be sufficient if it is a hydrophobic resin particle which is solid at a temperature of 35° C. or less and has high affinity for the non-aqueous solvent. However, the resin particle is preferably a resin (P) having a glass transition point of −5 to 110° C. or a softening point of 33 to 140° C., more preferably having a glass transition point of 10 to 100° C. or a softening point of 38 to 120° C., still more preferably having a glass transition point of 15 to 80° C. or a softening point of 38 to 100° C.

By using a resin having such a glass transition point or softening point, the affinity between the surface of the printing medium and the resin particle increases and the bonding among the resin particles is intensified on the printing medium, so that the adhesion between the image area and the surface of the printing medium is improved and the rubbing resistance is also improved. If the glass transition point or softening point is lower or higher than the above-described range, the affinity between the surface of the printing medium and the resin particle or the bonding force among resin particles may decrease.

The weight average molecular weight (Mw) of the resin (P) is from $1\times10^3$ to $1\times10^6$, preferably from $5\times10^3$ to $8\times10^5$, more preferably from $1\times10^4$ to $5\times10^5$.

Specific examples of the resin (P) include olefin polymers and copolymers (for example, polyethylene, polypropylene, polyisobutylene, ethylene-vinyl acetate copolymer, ethylene-acrylate copolymer, ethylene-methacrylate copolymer and ethylene-methacrylic acid copolymer), vinyl chloride polymers and copolymers (for example, polyvinyl chloride and vinyl chloride-vinyl acetate copolymer), vinylidene chloride copolymers, vinyl alkanoate polymers and copolymers, allyl alkanoate polymers and copolymers, polymers and copolymers of styrene and derivatives thereof (for example, butadiene-styrene copolymer, isoprene-styrene copolymer, styrene-methacrylate copolymer and styrene-acrylate copolymer), acrylonitrile copolymers, methacrylonitrile copolymers, alkyl vinyl ether copolymers, acrylic acid ester polymers and copolymers, methacrylic acid ester polymers and copolymers, itaconic acid diester polymers and copolymers, maleic acid anhydride copolymers, acrylamide copolymers, methacrylamide copolymers, phenolic resins, alkyd resins, polycarbonate resins, ketone resins, polyester resins, silicon resins, amide resins, hydroxyl group- or carboxyl group-modified polyester resins, butyral resins, polyvinyl acetal resins, urethane resins, rosin-type resins, hydrogenated rosin resins, petroleum resins, hydrogenated petroleum resins, maleic acid resins, terpene resins, hydrogenated terpene resins, chroman-indene resins, cyclic rubber-methacrylic acid ester copolymers, cyclic rubber-acrylic acid ester copolymers, copolymers containing a heterocyclic ring having no nitrogen atom (examples of the heterocyclic ring include furan ring, tetrahydrofuran ring, thiophene ring, dioxane ring, dioxofuran ring, lactone ring, benzofuran ring, benzothiophene ring and 1,3-dioxetane ring), and epoxy resins.

The total content of colored particles and resin particles dispersed in the oil-based ink for use in the present invention is preferably from 0.5 to 20 wt % based on the entire ink. If the content is less than this range, problems are liable to arise, for example, the printed image is deficient in the density or the ink can hardly have affinity for the surface of the printing medium to fail in obtaining a firm image. On the other hand, if the content exceeds the above-described range, uniform dispersion may not be easily obtained or non-uniform ink flow readily occurs in the ejection head to fail in attaining stable ink ejection.

The particles dispersed in the non-aqueous solvent for use in the present invention, including the colored particles and further resin particles, preferably have an average particle size of 0.05 to 5 μm, more preferably from 0.1 to 1.0 μm. This particle size is determined by CAPA-500 (trade name, manufactured by Horiba Seisakusho Co., Ltd.).

The non-aqueous disperse colored particle for use in the present invention may be produced by a conventionally known mechanical grinding method or polymerizing granulation method. Examples of the mechanical grinding method include a method where a colorant and a resin are mixed, if desired, these are melted, kneaded and directly ground into fine particles by a conventionally known grinder and the fine particles are dispersed using a dispersion polymer in combination by a wet dispersing machine (for example, ball mill, paint shaker, Kedy mill and Dyno mill), and a method where a coloring material as a colored particle component and a dispersion aid polymer (or covering polymer) are previously kneaded and the kneaded product is ground and then dispersed in the presence of a dispersion polymer. Specifically, a production process for coating materials or liquid developers for electrostatic photography may be utilized and this is described, for example, in Kenji Ueki (supervisor of translation), *Toryo no Ryudo to Ganryo Bunsan* (*Flow of Coating Materials and Dispersion of Pigments*), Kyoritsu Shuppan (1971), Solomon, *Toryo no Kagaku* (*Science of Coatings*), Hirokawa Shoten (1969), Yuji Harasaki, *Coating Kogaku* (*Coating Engineering*), Asakura Shoten (1971), and Yuji Harasaki, *Coating no Kiso Kagaku* (*Basic Science of Coating*), Maki Shoten (1977).

A method of granulating resin particles by the polymerizing granulation method and coloring the resin particles with a dye to produce colored particles may also be used. Examples of the polymerizing granulation method include a conventionally known non-aqueous dispersion polymerization method and this is specifically described, for example, in Soichi Muroi (supervisor of compilation), *Cho-Biryushi Polymer no Saishin Gijutsu* (*Latest Technology of Ultrafine Polymers*), Chapter 2, CMC Shuppan (1991), Koichi Nakamura (compiler), *Saikin no Denshi-Shasin Genzo System to Toner Zairyo no Kaihatsu/Jitsuyoka* (*Recent Electrophotographic Developing Systems and Development and Practical Use of Toner Materials*), Chapter 3, Nippon Kagaku Joho K. K. (1985), and K. E. J. Barrett, *Dispersion Polymerization in Organic Media*, John Wiley (1975).

In order to dispersion-stabilizing the dispersed particles in the non-aqueous solvent, a dispersion polymer is usually used in combination. The dispersion polymer mainly comprises a repeating unit soluble in the non-aqueous solvent and has a weight average molecular weight (Mw) of $1\times10^3$ to $1\times10^6$ more preferably from $5\times10^3$ to $5\times10^5$.

The preferred soluble repeating unit of the dispersion polymer for use in the present invention includes a polymerization component represented by following formula (I):

(I)

In formula (I), $X_1$ represents —COO—, —OCO— or —O—, R represents an alkyl or alkenyl group having from 10 to 32 carbon atoms, preferably an alkyl or alkenyl group having from 10 to 22 carbon atoms. The alkyl or alkenyl group may be linear or branched and may have a substituent but the alkyl or alkenyl group is preferably unsubstituted.

Examples thereof include a decyl group, a dodecyl group, a tridecyl group, a tetradecyl group, a hexadecyl group, an octadecyl group, an eicosanyl group, a docosanyl group, a decenyl group, a dodecenyl group, a tridecenyl group, a hexadecenyl group, an octadecenyl group and a linoleyl group.

$a_1$ and $a_2$ may be the same or different and each represents a hydrogen atom, a halogen atom (e.g., chlorine, bromine), a cyano group, an alkyl group having from 1 to 3 carbon atoms (e.g., methyl, ethyl, propyl), —COO—$Z_1$ or —CH$_2$COO—$Z_1$ (wherein $Z_1$ represents a hydrocarbon group having 22 or less carbon atoms, which may be substituted, such as alkyl group, alkenyl group, aralkyl group, alicyclic group and aryl group).

Among the hydrocarbon groups represented by $Z_1$, preferred hydrocarbon groups are an alkyl group having from 1 to 22 carbon atoms, which may be substituted (such as methyl group, ethyl group, propyl group, butyl group, hexyl group, heptyl group, octyl group, nonyl group, decyl group, dodecyl group, tridecyl group, tetradecyl group, hexadecyl group, octadecyl group, eicosanyl group, docosanyl group, 2-chloroethyl group, 2-bromoethyl group, 2-cyanoethyl group, 2-methoxycarbonylethyl group, 2-methoxyethyl group and 3-bromopropyl group), an alkenyl group having from 4 to 18 carbon atoms, which may be substituted (such as 2-methyl-1-propenyl group, 2-butenyl group, 2-pentenyl group, 3-methyl-2-pentenyl group, 1-pentenyl group, 1-hexenyl group, 2-hexenyl group, 4-methyl-2-hexenyl group, decenyl group, dodecenyl group, tridecenyl group, hexadecenyl group, octadecenyl group and linolenyl group), an aralkyl group having from 7 to 12 carbon atoms, which may be substituted (such as benzyl group, phenethyl group, 3-phenylpropyl group, naphthylmethyl group, 2-naphthylethyl group, chlorobenzyl group, bromobenzyl group, methylbenzyl group, ethylbenzyl group, methoxybenzyl group, dimethylbenzyl group and dimethoxybenzyl group), an alicyclic group having from 5 to 8 carbon atoms, which may be substituted (such as cyclohexyl group, 2-cyclohexylethyl group and 2-cyclopentylethyl group) and an aromatic group having from 6 to 12 carbon atoms, which may be substituted (such as phenyl group, naphthyl group, tolyl group, xylyl group, propylphenyl group, butylphenyl group, octylphenyl group, dodecylphenyl group, methoxyphenyl group, ethoxyphenyl group, butoxyphenyl group, decyloxyphenyl group, chlorophenyl group, dichlorophenyl group, bromophenyl group, cyanophenyl group, acetylphenyl group, methoxycarbonylphenyl group, ethoxycarbonylphenyl group, butoxycarbonylphenyl group, acetamidophenyl group, propionamidophenyl group and dodecyloylamidophenyl group).

The dispersion polymer may contain other repeating unit as a copolymerization component together with the repeating unit represented by formula (I). The other copolymerization component may be any component as long as it comprises a monomer copolymerizable with the monomer corresponding to the repeating unit represented by formula (I).

The ratio of the polymer component represented by formula (I) present in the dispersion polymer is preferably 50 wt % or more, more preferably 60 wt % or more.

Specific examples of the dispersion polymer include Resin (Q-1) for dispersion stabilization used in Examples. Also, commercially available products (for example, Solprene 1205, produced by Asahi Chemical Industry Co., Ltd.) may be used.

In the case of producing the particles of Resin (P) as an emulsified product (latex), the dispersion polymer is preferably added in advance to the polymerization.

In the case of using the dispersion polymer, the amount added thereof is approximately from 0.05 to 4 wt % based on the entire ink.

The dispersed resin particle and the colored particle (or coloring material particle) in the oil-based ink for use in the present invention are each an electroscopic particle bearing positive or negative charge.

In the case of imparting electroscopicity to these particles, this may be achieved by appropriately using a technique of the developer for wet electrostatic photography. To speak specifically, the electroscopicity is imparted using an electroscopic material such as charge controlling agent and other additives described, for example, in Saikin no Denshi-Shasin Genzo System to Toner Zairyo no Kaihatsu/Jitsuyoka (Recent Electrophotographic Developing Systems and Development and Practical Use of Toner Materials), supra, pp. 139–148, Denshi Shashin Gijutsu no Kiso to Oyo (Elementary Study and Application of Electrophotographic Technology), Denshi Shashin Gakkai (compiler), pp. 497–505, Corona Sha (1988), and Yuji Harasaki, Denshi Shashin (Electrophotography), 16 (No. 2), page 44 (1977).

This is more specifically described, for example, in British Patents 893429 and 934038, U.S. Pat. Nos. 1,122,397, 3,900,412 and 4,606,989, JP-A-60-179751, JP-A-60-185963 and JP-A-2-13965.

The amount of such a charge controlling agent is preferably from 0.001 to 1.0 part by weight per 1,000 parts by weight of the dispersion medium as a carrier liquid. If desired, various additives may be further added and the upper limit of the total amount of these additives is limited by the electric resistance of the oil-based ink. More specifically, if the electric resistance of the ink in the state where dispersed particles are removed is less than $10^9$ Ωcm, an image with good continuous gradation may not be obtained. Therefore, the amounts of the additives are preferably controlled within this limit.

The present invention will be described in greater detail by referring to the following Examples, but the present invention should not be construed as being limited thereto.

The production example of Resin Particle (PL-1) for ink is described below.

PRODUCTION EXAMPLE 1

Production of Resin Particle (PL-1)

A mixed solution containing 10 g of Resin (Q-1) for dispersion stabilization having a structure shown below, 100 g of vinyl acetate and 384 g of Isoper H was heated to a temperature of 70° C. while stirring in a nitrogen stream. Thereto, 0.8 g of 2,2'-azobis(isovaleronitrile) (hereinafter simply referred to as "A.I.V.N.") was added as a polymerization initiator and the reaction was performed for 3 hours. 20 Minutes after the addition of the initiator, the solution turned to milky white and the reaction temperature was elevated to 88° C. Thereto, 0.5 g of the same initiator was further added and the reaction was performed for 2 hours. Thereafter, the temperature was elevated to 100° C., the reaction solution was stirred for 2 hours, and unreacted vinyl acetate was removed by distillation. The residue was cooled and passed through a 200-mesh nylon cloth. The white dispersion obtained was a latex having a polymerization ratio of 90%, an average particle size of 0.23 μm and good monodispersity. The particle size was measured by CAPA-500 (manufactured by Horiba Seisakusho K.K.).

Resin (Q-1) for Dispersion Stabilization

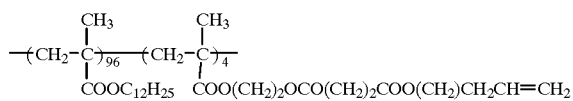

Mw: $5 \times 10^4$ (by weight)

A part of this white dispersion was centrifuged (revolution number: $1 \times 10^4$ rpm, revolution time: 60 minutes) and the precipitated resin particle portion was collected and dried. The resin particle portion had a weight average molecular weight (Mw, GPC value in terms of polystyrene) of $2 \times 10^5$ and a glass transition point (Tg) of 38° C.

EXAMPLE 1

An oil-based ink was prepared.
<Preparation of Oil-based Ink (IK-1)>

Into a paint shaker (manufactured by Toyo Seiki K.K.), 10 g of dodecyl methacrylate/acrylic acid copolymer (copolymerization ratio: 95/5 by weight), 10 g of nigrosine and 30 g of Shellsol 71 were charged together with glass beads and dispersed for 4 hours to obtain a finely divided nigrosine dispersion.

Then, 30 g (as solid contents) of Resin Particle (PL-1) produced in Preparation Example 1 of Resin Particle for Ink, 20 g of the nigrosine dispersion prepared above, 15 g of FOC-1400 (tetradecyl alcohol, produced by Nissan Chemical Industries Co., Ltd.) and 0.08 g of an octadecene-half maleic acid octadecylamide copolymer were diluted with 1 liter of Isoper G to prepare a black oil-based ink.

Thereafter, 2 liter of the thus-prepared oil-based ink (IK-1) was filled in an ink tank of an ink jet drawing device of the printing apparatus shown in FIG. 3. The ejection head used here was a 900 dpi full line head of the type shown in FIG. 14. In the ink tank, an immersion heater and a stirring blade were provided as the ink temperature-controlling member and by setting the ink temperature to 30° C., the temperature was controlled using a thermostat while rotating the stirring blade at 30 rpm. The stirring blade used here was also served as the stirring member for preventing precipitation and coagulation. A part of the ink passage was made transparent, and an LED light emission device and a light detecting device were disposed to sandwich the transparent portion. Based on the output signal therefrom, the concentration was controlled by charging a diluting solution (Isoper G) or a concentrated ink (prepared by adjusting the solid concentration of Ink (IK-1) to 2 times).

For forming a image carrier, an elastic layer having the following composition was formed to a thickness of 7 mm on an aluminum drum having a diameter of 170 mm, a width of 360 mm and a thickness of 8 mm.

| | |
|---|---|
| Styrene butadiene rubber | 100 parts |
| Carbon black | 10 parts |
| Paraffin-based oil | 30 parts |
| Vulcanizing agent | 2 parts |
| Vulcanization aid | 5 parts |

On the surface of the elastic layer formed on the drum, a dispersion solution according to the following formulation was coated by spraying.

| | |
|---|---|
| Urethane polymer precursor solution | 80 parts |
| Curing agent solution | 30 parts |
| Teflon fine powder material | 60 parts |
| Dispersion aid | 3 parts |
| Solvent | 60 parts |

Thereafter, the solution was heated at 100° C. for 1 hour to form a 95 $\mu$m-thick surface layer on the surface of the elastic layer, thereby obtaining an image carrier.

The drum of the thus-obtained image carrier was disposed to oppose the ink jet drawing device 2 of the printing apparatus 1 (see, FIG. 3), the ejection head was approximated to the image carrier and stopped at the drawing position, the image data to be printed were transmitted to the image data arithmetic and control part and while rotating the drum, the ejection head was moved, thereby ejecting an oil-based ink on the surface of the drum to form an image. At this time, the ejection electrode of the ink jet head had a tip width of 10 $\mu$m and the distance between the head and the drawing drum was controlled to 1 mm by the output from an optical cap detecting device. A voltage of 2.5 KV was always applied as a bias voltage and at the time of performing the ejection, a pulse voltage of 500 V was superimposed. The pulse voltage was changed through 256 stages in the range from 0.2 to 0.05 msec and thereby the drawing was performed while changing the dot area. At this time, the temperature on the surface layer of the drum was adjusted to about 35° C.

Subsequently, using a rolled fine coated paper sheet as the printing medium, the dusts on the surface of the printing medium was removed by air pump suction and then the printing medium was transported on a transportation drum self-containing a heater and contacted with the surface of the drawing drum as an image carrier. While applying a pressure of 0.3 Mpa using a heating drum at 80° C., the image formed on the surface of the drawing drum was transferred onto the rolled fine coated paper sheet. The image was 100% transferred onto the rolled fine coated paper sheet.

The printing medium was then heated by a xenon flash fixing apparatus (200 J/pulse, manufactured by Ushio Denki) to firmly fix the image. After the completion of printing, the ink jet drawing device was retreated 50 mm from the position proximate to the drawing drum so as to protect the ink jet head.

The resulting printed matter had a very clear image free of slipping or thinning. 10 Minutes after the completion of printing, Isoper G was fed to the head and from the head opening, the Isoper G was dropped to clean the head. Thereafter, the head was stored in a cover filled with vapor of Isoper G, as a result, the head could be stored for 3 months without requiring any maintenance operation and a good printed matter could be prepared.

EXAMPLE 2

In this Example, the printing apparatus shown in FIGS. 4 and 5 was used, where a circulation pump as the stirring member and four units of 150-dpi 64-channel multi-channel heads of the type shown in FIG. 13 were used and the heads each was disposed to array the ejection parts of 64 channels in the direction right angled to the rotational direction of the drawing drum.

The drawing drum 4 was the same as used in Example 1. That is, a drawing drum having an image carrier obtained by providing an elastic layer having the same composition to a thickness of 7 mm on an aluminum drum having a diameter of 170 mm, a width of 360 mm and a thickness of 8 mm, spray-coating a dispersion solution having the same composition on this surface by spraying and then heating it at 100° C. for 1 hour to form a 95 $\mu$m-thick surface layer on the surface of the elastic layer, was used. As the printing medium, a rolled fine coated paper was used.

Four color oil-based inks were used, namely, black ink IK-1, cyan ink IK-2 prepared in the same manner as IK-1 except for using Phthalocyanine Blue in place of nigrosine used as a coloring material of IK-1, magenta ink IK-3 prepared in the same manner as IK-1 except for using CIO pigment red 57:1 in place of nigrosine used as a coloring material of IK-1, and yellow ink IK-4 prepared in the same manner as IK-1 except for using CI pigment yellow 14 in place of nigrosine used as a coloring material of IK-1. These inks were filled in respective heads.

In this Example, a pump was used and an ink reservoir was provided between this pump and the ink inflow passage of the ejection head and between the ink recovery passage of the ejection head and the ink tank. The ink was circulated using the difference in the hydrostatic pressure. A heater and the above-described pump were used as the ink temperature-controlling member and the ink temperature was set to 35° C. and controlled by a thermostat. The circulating pump used here was served also as the stirring member for preventing the precipitation and coagulation.

On the ink passage, an electrical conductivity-measuring device was disposed and based on the output signal therefrom, the ink concentration was controlled by charging a diluting ink or a concentrated ink. After removing dusts on the surface of the drawing drum using a nylon-made rotary brush, the image data to be printed were transmitted to the image data arithmetic and control part. Then, the ejection head was moved in the axial direction of the drawing drum to perform sub-scanning and at the same time, main scanning was performed while rotating the drawing drum, thereby ejecting an ink on the surface of the drawing drum to form an image. Thereafter, the image was transferred to a rolled fine coated paper sheet.

Drawing failure and the like ascribable to dusts were not observed at all and even with changes in the ambient temperature or increase in the number of printed sheets, the image was completely free from deterioration due to change in the dot size and the like. In either case of using an ejection head of the type shown in FIG. 14 or 16, good one-side or two-side full color printing could be performed.

When after the completion of printing, Isoper G was circulated to the head and then a non-woven fabric impregnated with Isoper G was contacted with the head tip to perform the cleaning, the head could be stored for 3 months without requiring any maintenance operation and a good printed matter could be prepared.

Furthermore, the image drawing and printing were performed in the same manner except for using a 150 dpi multi-channel head with 64 channels of the type shown in FIG. 16 in place of the ink jet head of the type shown in FIG. 14, as a result, good results were obtained similarly to the above.

EXAMPLE 3

Using the printing apparatus shown in FIG. 7, full color printing of one-side four-color printing was performed. The drawing drum 4 was the same as used in Example 1, the printing medium was coated paper, four color inks described in Example 4 were used for four sets of ink jet drawing devices, 4 units of 100 dpi multi-channel heads with 256 channels of the type shown in FIG. 18 were used and each was disposed to array the ejection parts in parallel with the axis of the drawing drum, the main scanning was performed by the rotation of the drawing drum, a 900 dpi image was drawn on the surface of the drawing drum by sequentially moving the ejection heads in the axial direction of the drawing drum every each rotation, and the image was transferred onto the coated paper. As a result, a clear and high-quality full color printed matter was obtained.

EXAMPLE 4

Using the printing apparatus shown in FIGS. 9 and 10, full color printing of one-side four-color printing was performed. The oil-based inks were the same four color inks as used in Example 3. The ejection head used in this Example was a 600 dpi multi-channel head with 64 channels of the type shown in FIG. 14 and the head was disposed to array the ejection parts at an angle of about 60° with respect to the rotating direction of the drawing drum. The image data to be printed were transmitted to the image data arithmetic and control part, a 700 dpi image was formed while moving the multi-channel head with 64 channels in the direction right angled to the rotating direction of the drawing drum, and a printing medium was transported by the rotation of capstan rollers, whereby the 700 dpi image was transferred onto the processed paper exclusive for ink jet printing. As a result, good full color printing of four-color printing could be performed.

According to the present invention, an image is first formed on the surface of an image carrier by an ink jet method of ejecting an oil-based ink using an electrostatic field based on signals of image data, the image formed on the image carrier is contact-transferred onto a printing medium, and then the image is fixed to obtain a printed matter. The image carrier has a smooth surface on a drum or the like which can be processed and disposed with high mechanical precision and the distance with the drawing head can be precisely adjusted, so that very high precision can be held for the position where the ink is ejected and in turn, a high-precision image can be formed. Furthermore, means for preventing the contact of the printing medium with the ink jet drawing device as required in conventional techniques needs not be disposed at all, for example, means for closely contacting the printing medium with the drawing (opposing) drum only in the periphery of the drawing position of the ink jet drawing device at least at the time of performing the drawing, more specifically, presser roller or guide upstream and downstream of the drawing position of the drawing drum, electrostatic adsorption and the like.

In addition, the image is formed on a printing medium through an image carrier by contact transfer and therefore, the contact pressure, contact temperature and the like of the ink at the transfer onto the printing medium can be controlled to appropriate values, so that the retentivity of the image transferred to the printing medium can be elevated. The retentivity of the image can be more elevated by passing through a fixing step after the transfer of the image. Therefore, a large number of high-quality printed matters can be stably obtained.

While the invention has been described in detail and with reference to specific embodiments thereof, it will be apparent to one skilled in the art that various changes and modifications can be made therein without departing from the spirit and scope thereof.

What is claimed is:

1. A printing process for preparing a printed matter comprising:

forming an image on the surface of an image carrier by an ink jet method comprising ejecting an oil-based ink using electrostatic field based on signals of image data; and contact-transferring the image formed on said image carrier onto a printing medium to prepare a printed matter.

2. The ink jet printing process according to claim 1, wherein said oil-based ink comprises:

a nonaqueous solvent having an electric resistivity of $10^9$ $\Omega$cm or more and a dielectric constant of 3.5 or less; and a component dispersed in said nonaqueous solvent, which comprises at least colored particles.

3. The ink jet printing process according to claim 1, further comprises adjusting a surface temperature of said image carrier to the range of from 30 to 40° C. at the time of forming an image on said image carrier.

4. The ink jet printing process according to claim 1, further comprising fixing the image contact-transferred onto the printing medium.

5. A printing apparatus comprising:

ink jet drawing unit which ejects an oil-based ink from an ejection head using an electrostatic field based on signals of image data to form an image on an image carrier; and image transfer member which contact-transfers the image formed on said image carrier onto a printing medium to obtain a printed matter.

6. The printing apparatus according to claim 5, wherein said oil-based ink comprises:

a nonaqueous solvent having an electric resistivity of $10^9$ $\Omega$cm or more and a dielectric constant of 3.5 or less; and a component dispersed in said nonaqueous solvent, which comprises at least colored particles.

7. The printing apparatus according to claim 5, wherein said image carrier is a rotary body comprising a drum or an endless belt.

8. The printing apparatus according to claim 7, wherein said rotary body is rotatable to perform main scanning at the time of drawing an image on said image carrier.

9. The printing apparatus according to claim 8, wherein said ejection head comprises a single channel head or a multi-channel head and is movable in a direction parallel to the axis of said rotary body to perform sub-scanning.

10. The printing apparatus according to claim 8, wherein said ejection head comprises a full line head having almost the same length as a width of said rotary body in the axis direction.

11. The printing apparatus according to claim 5, wherein said image carrier has elasticity.

12. The printing apparatus according to claim 5, further comprising a temperature-controlling member which adjusts a surface temperature of said image carrier to the range from 30 to 40° C. at the time of ejecting the ink on said image carrier from said ink jet drawing unit.

13. The printing apparatus according to claim 5, further comprising a cleaning member which cleans said image carrier.

14. The printing apparatus according to claim 5, further comprising an image fixing member which fixes the image contact-transferred onto said printing medium.

15. The printing apparatus according to claim 14, wherein said image fixing member has a heating member comprising at least one of a heat roller, an infrared lamp, a halogen lamp and a xenon lamp.

16. The printing apparatus according to claim 15, wherein said heating member is disposed and/or controlled to gradually elevate a temperature of said printing medium at the time of fixing said image.

17. The printing apparatus according to claim 5, wherein said ink jet drawing unit further has an ink supply member which supplies said oil-based ink to said ejection head.

18. The printing apparatus according to claim 17, further comprising an ink recovery member which recovers said oil-based ink from said ejection head.

19. The printing apparatus according to claim 5, wherein said ink jet drawing unit further has an ink tank for storing said oil-based ink and a stirring member which stirs said oil-based ink in said ink tank.

20. The printing apparatus according to claim 5, wherein said ink jet drawing unit has an ink temperature-controlling member which controls the temperature of said oil-based ink in at least one of an ink tank for storing said oil-based ink and an ink passage.

21. The printing apparatus according to claim 5, wherein said ink jet drawing unit has an ink concentration-controlling member which controls the concentration of said oil-based ink.

22. The printing apparatus according to claim 5, further comprising at least a pair of capstan rollers which allows said printing medium to travel while being interposed and held therebetween to perform the transfer.

23. The printing apparatus according to claim 5, further comprising a cleaning member which removes dusts present on the surface of said printing medium at least one of before and during the transfer onto said printing medium.

24. The printing apparatus according to claim 5, further comprising a cleaning member which cleans said ejection head.

* * * * *